United States Patent [19]
Nishioka et al.

[11] Patent Number: 6,033,780
[45] Date of Patent: Mar. 7, 2000

[54] FINE PARTICLES OF PETALOID POROUS HYDROXYAPATITE AND PROCESS FOR PRODUCING THE SAME

[75] Inventors: Hidehiko Nishioka; Shigeo Takiyama; Minoru Hanazaki, all of Hyogo, Japan

[73] Assignee: Maruo Calcium Company Limited, Akashi, Japan

[21] Appl. No.: 08/973,866

[22] PCT Filed: Jul. 5, 1996

[86] PCT No.: PCT/JP96/01867

§ 371 Date: Jan. 5, 1998

§ 102(e) Date: Jan. 5, 1998

[87] PCT Pub. No.: WO97/03016

PCT Pub. Date: Jan. 30, 1997

[30] Foreign Application Priority Data

Jul. 7, 1995 [JP] Japan .................................... 7/196144

[51] Int. Cl.$^7$ .............................. B32B 5/16; C04B 16/08
[52] U.S. Cl. .......................... 428/402; 106/122; 106/672; 106/682; 106/816
[58] Field of Search ............................ 428/402; 106/122, 106/672, 682, 816

[56] References Cited

FOREIGN PATENT DOCUMENTS 1-290513  11/1989  Japan .
7-2505    1/1995   Japan .

*Primary Examiner*—Hoa T. Le
*Attorney, Agent, or Firm*—Armstrong, Westerman, Hattori, McLeland & Naughton

[57] ABSTRACT

The fine particles of peraloid porous hydroxyapatite are provided, which have an atomic ratio of Ca/P in a range of 1.62–1.72 and the chemical formula $Ca_5(PO_4)_3(OH)$. The particles are comprised of micropores having a petaloid porous structure not only on the surface but also in the inside of the particles, and have the specific particle diameter of the specific particle size, micropore diameter of the specific particle size, the specific surface of the specific range, static and pressurized percentage of voids of the specific range. The particles have superior dispersibility and are useful in the fields such as carriers for pharmaceuticals and so on, adsorbents, absorbents, sustained-release materials, filtering agents, biological materials, fillers for plastics, and anti-blocking agents for films and so on.

19 Claims, No Drawings

FINE PARTICLES OF PETALOID POROUS HYDROXYAPATITE AND PROCESS FOR PRODUCING THE SAME

TECHNICAL FIELD

The present invention relates to fine particles of petaloid porous hydroxyapatite having a specific particle diameter, specific dispersibility, specific diameter of micropore and specific percentage of voids, an atomic ratio of Ca/P of 1.62–1.72 and the chemical formula $Ca_5(PO_4)_3(OH)$, and a method for manufacturing the same. Further, the method of the present invention provides a method for manufacturing the novel fine particles of petaloid porous hydroxyapatite of the present invention with low cost and industrially with ease.

The novel fine particles of petaloid porous hydroxyapatite of the present invention are useful as carriers for catalysts, pharmaceuticals., agricultural medicines, microbials, biologicals and peroxides, plant growth agents, absorbents of olefins, absorbents of ultraviolet, adsorbents, sustained-release materials, liquids-absorbing agents, raw materials for ceramics, many kinds of carriers, filtering agents, filtering aids, molding aids, growth for microbials, biological materials, drying agents, carriers for fragrants and so on, or raw materials thereof, fillers for plastics, rubbers, paints, ink, sealing materials and a paper manufacture, and anti-blocking agents for fibers and films. Furthermore, a new use of the particles can be developed by combining the above mentioned many kinds of use.

BACKGROUND ART

It is well known that porous hydroxyapatite exists in a human body. For example, the porous hydroxyapatite is a component of bone and teeth. Therefore, recently, the porous hydroxyapatite is focused as a raw material for bioceramics and many studies have been performed on the porous hydroxyapatite. On the other hand, fine powders of hydroxyapatite which are not porous are industrially manufactured and sold as raw materials for the porous hydroxyapatite, food additives (as calcium triphosphate), stabilizers for polymerization, catalysts and so on.

As known porous hydroxyapatites, (1)spherical apatite, (2)porous apatite, (3)hollow calcium phosphate, (4)granules of calcium phosphate compound, (5)porous bone supplement of calcium phosphate, (6)porous spherical calcium phosphate and so on are reported. The followings are outlines of the above known porous hydroxyapatites.

(1) As the spherical apatite, Japanese laid-open patent publication No.3-16906 entitled "Spherical apatite and manufacturing method thereof and porous structure molded articles" can be exemplified.

This prior art is directed to a spherical apatite, which is comprised of calcium phosphate having its composition of Ca/P molar ratio of 1.4–1.8 and a specific gravity of 3.00–3.17. The spherical apatite has features of a true spherical structure, and a minute and high mechanical strength. However, since the spherical apatite is minute, it has a defect that a percentage of voids is extremely low.

Manufacturing method of the spherical apatite is that a slurry comprising hydroxyapatite as its main component is dried and powdered to prepare aggregates of primary apatite particles, preferably, spray dried to form spherical particles, and then the prepared aggregates of primary apatite particles are fused in a flame of 1500° C. or more so as to obtain the spherical apatite.

The prior art discloses that an apatite of porous structure can be obtained by mixing an adhesive to the aforementioned spherical apatite, pressure molding, and then calcinating in the flame of 1500° C. or more, however, the percentage of voids of the thus obtained porous structure in Examples is 28%, which is a very low value, and therefore, it can not be said that the obtained porous structure has high percentage of voids.

(2) As the porous apatite, Japanese patent publication No.2-14311 entitled "A method for manufacturing a porous apatite" can be exemplified.

Claim 1 of the patent publication describes as follows: "A method for manufacturing a porous apatite which comprises blending calcium carbonate powders to calcium hydrogenphosphate.$2H_2O$ or an anhydride thereof so that the Ca/P molar ratio becomes 1.50–1.67 and hydrating them by adding water".

Since the obtained porous structure is not a fine particle, but cured in the whole body by hydration reaction. There is a description in Examples that a water-cured apatite of a single phase having a void volume of 71–76% was obtained. However, the obtained apatite has a chemical formula $Ca_{10}$-$Z(HPO_4)(PO_4)_6$-$Z(OH)_2$-$Z.nH_2O$, wherein Z=0, and therefore, has a crystalline water. Therefore, the obtained apatite is not a hydroxyapatite. It is described in the specification that the hydroxyapatite expressed by the formula $Ca_{10}(PO_4)_6(OH)_2$ can be obtained by calcinating the water-cured apatite at 1000–1350° C. and the void volume, which corresponds to a percentage of voids, of the hydroxyapatite was lowered compared to that of before the calcination, and the void volume of the hydroxyapatite obtained in Examples is 45–50%, which is very low level. Although it is described in the specification that a higher range of the void volume can be controlled and obtained, there is no description regarding the value of the void volume of the hydroxyapatite being more than 45–50% and a method for manufacturing the hydroxyapatite having such high void volume.

Furthermore, all of Examples 1–4 and Comparative examples perform the hydration reaction in the Pyrex glass tube with a cap under conditions of an inner temperature being 50° C. or 80° C. It is described in the specification that according to a reaction scheme, 1 mol of carbon dioxide may be generated with respect to 1 mol of calcium carbonate as a raw material. Therefore, it is clear that inner pressure of the Pyrex glass tube with the cap is very high compared with the atmospheric pressure, and it can be said that the hydration reaction is analogous to a reaction performed in an autoclave under pressure. Moreover, there is no description with respect to the specific calcium hydrogenphosphate.$2H_2O$ or the specific calcium carbonate to be used.

(3) As the hollow calcium phosphate, Japanese laid-open patent publication No.63-198970 entitled "Hollow body of calcium phosphate" can be exemplified.

This laid-open publication is directed to a hollow sphere with open pores, but not directed to a porous structure, and the specific area described in the specification is 1–6 $m^2/g$, which is far less than 10 $m^2/g$.

As a manufacturing method, a method of mixing calcium phosphate and an organic foaming agent, foaming the mixture and calcinating at 900–1400° C. is described.

(4) As the granules of calcium phosphate compound, Japanese laid-open patent publication No.1-230412 entitled "Granules of calcium phosphate compound" can be exemplified.

This laid-open publication is directed to granules, but not to a porous structure. Furthermore, the disclosed real surface area (specific surface area) is a very low value, 0.02–0.05 $m^2/g$.

As a manufacturing method, it is described that the granules are prepared by making particles with the hydroxyapatite and an organic binder and then removing the organic binder by sintering. As another method, it is described that, instead of the organic binder, a binder of apatite sol obtained by a reaction in a non-aqueous solvent is used so as to make particles, and the particles are dried and sintered. Therefore, it is essential that the organic binder or non-aqueous solvent should be removed.

(5) As the porous bone supplement of calcium phosphate, Japanese patent publication No.1-49501 entitled "Porous bone supplement of calcium phosphate" can be exemplified.

The porous bone supplement of calcium phosphate obtained by the publication has a large porous structure of more than several mm.

As a method for preparing the porous structure, it is described that a heat decomposable beads such as hydroxyapatite powder, polystyrene beads and so on and a forming agent such as aqueous solution of hydrogen peroxide are wet mixed, then foamed and dried in the drier, and the thus obtained dried materials are heat decomposed and sintered at 900–1400° C. under the specific temperature-raising condition.

(6) As the porous spherical calcium phosphate, Japanese patent publication No.4-44606 entitled "Method for manufacturing porous spherical calcium phosphate" can be exemplified.

It is described in the specification that the porous spherical calcium phosphate obtained in the publication has micropores of a close-cropped or spherical form having a specific surface of 1–50 $m^2/g$, a particle diameter of 1–100 $\mu m$, and a micropore diameter of 0.01–0.5 $\mu m$. The specific surface of the hydroxyapatite disclosed in Examples is 5 $m^2/g$, which is a very low surface area. The publication also describes a spherical form of porous calcium phosphate in which the diameter of micropores is enlarged by sintering the particle at 1100° C., however, since, generally, the specific surface is believed to be lowered after heat treatment (sintering), the specific surface is supposed to be 5 $m^2/g$ or less. Regarding porous spherical calcium phosphate which is composed of β-tricalcium phosphate, not a hydroxyapatite, it is merely described that the specific surface is 10 $m^2/g$, which is higher than that of the above mentioned hydroxyapatite. Therefore, it can not be said that the porous spherical calcium phosphate composed of hydroxyapatite having the specific surface of 50 $m^2/g$ can be prepared easily.

As methods of manufacturing the porous spherical calcium phosphate, a method is described that 1 mol of water soluble calcium salt, 1–1.2 mol of a calcium ion complexing agent and 0.5–1 molar of water soluble phosphate are mixed, the pH of the mixture is adjusted to 5–11, then hydrogen peroxide is added to the mixture so that the concentration of the hydrogen peroxide becomes 1–20% by weight, and the mixture is heat reacted at 50–100° C. so as to prepare the porous spherical calcium phosphate, and further, heat treatment (sintering) at 900–1500° C. is also described. It is necessary that by-products of the reaction (salts such as NaCl) and the calcium ion complexing agent should be removed by washing with water. Furthermore, when the value of the specific surface becomes high, there is a tendency that these impurities are difficult to be separated. Therefore, it is supposed that the porous spherical calcium phosphate in which the impurities are remained are apt to be obtained.

The conventional method of manufacturing the porous hydroxyapatite is mainly that fine particles of hydroxyapatite having known plate-like, needle-like, spherical form and so on are aggregated, so as to obtain porous structures caused by the vacancy made by the particles or aggregates. Therefore, since the influence of the fine particles of the raw materials is significant, the obtained porous hydroxyapatite is limited to that having the above mentioned defects. As a major method for enlarging the percentage of voids, the foaming agent, organic spherical compound and organic binder are combined. However, since these compounds are inherently unnecessary for porous hydroxyapatite, a process for removing these compounds such as calcination is required. Moreover, since in the calcination process, the raw materials, i.e., fine particles of the hydroxyapatite, are sintered each other, and as a result, the specific surface is decreased. If the additives are not removed by calcination and so on, the specific surface and the percentage of voids can be lowered compared to the case where the additives are not added.

In a method for preparing fine particles by spray drying using a mere slurry of the particles in the solvent, the thus obtained particles tends to be broken down. Therefore, since the binders are required, there are the same defects as those of the case where the percentage of voids is increased as mentioned above.

There is a method for obtaining the porous hydroxyapatite by calcinating or fusing the fine particles of the calcium phosphate other than hydroxyapatite instead of the fine particle of the hydroxyapatite. However, since the fine particles of the raw materials are sintered each other as mentioned above, the specific surface can be lowered.

The followings are methods for preparing hydroxyapatite, however, these methods are not related to porous hydroxyapatite.

(7) As a report regarding calcium phosphate compounds which have high specific surface, Japanese laid-open patent publication No.5-68442 entitled "Sustained-release material of calcium phosphate" is exemplified.

Although claim 1 describes "Sustained-release material of calcium phosphate obtained from adsorbing at least one material to be released which is selected from the group consisting of deodorants, bactericides, agricultural medicines, fungicides and insecticides to a base composed of hydroxyapatite having specific surface of 100–250 $m^2/g$ by BET method", there is no description regarding porous hydroxyapatite.

A method of manufacturing hydroxyapatite described in Example 1 is a known method of adding a concentrated phosphoric acid aqueous solution of 40% to a calcium hydroxide aqueous dispersion of 10% concentration.

(8) A method for preparing the hydroxyapatite by adding phosphoric acid gradually to the calcium hydroxide aqueous suspension:

The aforementioned (7) is exemplified. This method has advantages that by-products other than calcium phosphate cannot be produced, and therefore, this is an excellent method in obtaining the mixture of hydroxyapatite and tricalcium phosphate. Generally speaking, hydroxyapatite obtained by this method has a needle-like, plate-like and spherical form of super fine particles of 0.1 $\mu m$ or less, and therefore, the hydroxyapatite has many defects that not only the dehydration and filtration of the reactant is poor (very low rate of filtration), but also it is not easy to wash due to the poor filtration ability, and dried powders tend to aggregate. Moreover, there are defects that the unreacted calcium hydroxide tends to remain, and since the remained calcium hydroxide reveals strong alkalinity, the calcium hydroxide, which is remained, can give inferior effects to the materials to be adsorbed. As improved methods, for example, a method that, after the reaction, the unreacted calcium hydroxide is removed by washing and/or heat treating at a higher temperature where the calcium hydroxide can be decomposed, preferably, at 900° C. or more, and a method of raising a reactivity of calcium hydroxide and phosphoric acid by a wet grinding-crushing by the use of a crushing medium such as glass beads, are reported.

(9) Many methods improving the above mentioned defects (8) are reported.

The improved methods such as water-heating synthetic method including a method for, after the reaction is completed, heat treating the reaction mixture at a high temperature of 80° C. or more for a long period of time or heating the reaction mixture in a closed vessel (autoclave) for a long period of time, a sintering synthetic method for, after preparing, synthesizing by sintering the prepared product at a temperature being 600° C. or more (preferably 900° C. or more), where calcium hydroxide can decompose, and a method for increasing the reactivity by grinding and crushing at the time of reacting, and so on are exemplified. By these methods, hydroxyapatite can be obtained, however, these methods have many defects: not only the process becomes complicated, but also specific surface is decreased by heat treatment, percentage of voids is decreased by sintering and break down of the porous material by grinding, and so on.

(10) Methods for preparing hydroxyapatite by sintering an intermediate which is prepared by hydration reaction of calcium salts which are water insoluble or difficult to dissolve in water, and phosphates.

A method using calcium carbonate as the calcium salt and calcium hydrogenphosphate.$2H_2O$ as the phosphate is also reported. As this method, aforementioned (2) can be exemplified and the method has the same defects as described. A method in which the reaction is performed in a water under stirring is reported.

For example, Japanese laid-open patent publication No.62-223010 entitled "Method for manufacturing hydroxyapatite" can be exemplified. However, there are no examples regarding combination of calcium carbonate and calcium hydrogenphosphate.$2H_2O$ nor description that a specific hydroxyapatite can be manufactured. Furthermore, Japanese patent publication No.58-30244 entitled "Method for manufacturing hydroxyapatite containing carbonic acid" can be exemplified. However, this method is characterized in that ammonium hydroxide is used in combination, and is a method for obtaining hydroxyapatite containing carbonic acid, which is different from hydroxyapatite. Moreover, it is described in Angew. Chem. internat. Edit./vol.5 (1966)/No.7, pp669–670 that, into the slurry of calcium carbonate of calcite crystal and calcium hydrogenphosphate.$2H_2O$, an air purified with KOH was introduced, several days after at 37° C., carbonate apatite, $5/4[Ca(PO_4)_2(HPO_4)_{0.4}(CO_3)_{0.6}]$, was obtained as a product, and that the feature of X-ray diffraction of the product is analogous to that of octacalcium phosphate. This product is different from the hydroxyapatite of the present invention.

(11) As a report regarding hydroxyapatite with high specific surface, Journal of Colloid and Interface Science, Vol.55, No.2(1976) pp409–p414 describes that hydroxyapatite having the specific surface of 198 $m^2/g$ by BET method was obtained by setting the starting ratio of $Ca^{2+}/PO_4^{3-}$ at 1.71, performing the reaction under nitrogen atmosphere at room temperature with stirring to obtain a precipitate, contacting the precipitate, amorphous calcium phosphate with a basic mother liquid for 4 days and then centrifuging the product, dialyzing the product using a membrane tube of Spectropor thereby washing with the distilled water, continuing the dialysis until the pH of the washed water becomes neutral, and subjecting to freeze drying. The product is different from the petaloid porous hydroxyapatite of the present invention.

(12) As a report regarding hydroxyapatite with high specific surface, Inorganic Chemistry (1982), vol.21 No.8, pp3029–3035 describes that a non-stoichiometrically amorphous and crystalline calcium phosphate was obtained by a precipitation reaction by mixing a phosphoric acid solution and a saturated solution of calcium hydroxide under, the pH of the mixture controlled at 7.00, 7.40, 8.25, 9.75 and 10.00. In this case, all the calcium carbonate which was produced upon the preparation of the saturated calcium hydroxide solution was removed so that the content of the calcium carbonate in the reaction system is as small as possible. Therefore, the disclosed method is not a method of manufacturing the hydroxyapatite from calcium carbonate and phosphoric acid, that is the present invention. Furthermore, the produced hydroxyapatite which lacks calcium has the specific surface of 163 $m^2/g$ by BET method, however, since the pH was adjusted by the mixing ratio of the phosphoric acid solution and the calcium hydroxide saturated solution, the Ca/P ratio of the produced powder becomes 1.40–1.58. Therefore, the hydroxyapatite with a high purity of the present invention can not be obtained.

(13) Methods for preparing hydroxyapatite by a solution reaction by mixing water soluble calcium salts and water soluble phosphate.

The aforementioned (6) is an improved method of this method, however, this method has many defects, such as difficulty in control of the reaction and removal of the by-products.

(14) Methods for preparing hydroxyapatite by preparing amorphous calcium phosphate as an intermediate by hydrolyzing calcium methoxide and organic phosphate compounds in an organic solvent, followed by chemical reaction or sintering and so on.

This method has many defects; expensive raw materials should be used, the reaction process is complicated, reproductivity of the process is difficult since the amorphous calcium phosphate is unstable, and so on.

(15) Method for preparing hydroxyapatite by dry synthetic method in which tricalcium phosphate and calcium salts are reacted in a water vapor of 900° C. or more.

This method has defects that, since the hydroxyapatite is produced by sintering at high temperature, the specific surface and the percentage of voids of the hydroxyapatite are low. There is an improved method in which an excess amount of calcium salts is added, and after the reaction is completed, CaO and others which are produced by the excess calcium salts are removed by washing with water.

(16) As a combination of calcium carbonate and phosphoric acid, Japanese laid-open patent publication No.1-290513 entitled "Method for manufacturing hydroxyapatite" is indicated. However, this method is directed to manufacturing hydroxyapatite with a Ca/P ratio of 1.67 by making an intermediate of tricalcium phosphate ($Ca_3(PO_4)_2$) whose Ca/P ratio is 1.5 and by reacting calcium carbonate with phosphoric acid, followed by adding calcium hydroxide to the intermediate in the closed vessel. Therefore, this method is not a method of manufacturing hydroxyapatite from calcium carbonate and phosphoric acid.

A method for preparing calcium phosphate having an atomic molar ratio of 0.5–1.5 from calcium carbonate and phosphoric acid is known, and as a calcium phosphate, calcium dihydrogen phosphate of Ca/P=0.5, calcium hydrogenphosphate and calcium hydrogenphosphate.2H$_2$O of Ca/P=1, tricalcium phosphate of Ca/P=1.5 and so on are exemplified.

In the conventional manufacturing method of porous hydroxyapatite and hydroxyapatite, there is no report regarding fine particles of porous hydroxyapatite which can satisfy all the properties of adjustable high percentage of voids, high specific surface and specific diameter of micropore and a manufacturing method thereof. Moreover, there is no report that the porous hydroxyapatite can retain superior properties and is easy to handle, and is a fine particle having superior dispersibility and specific diameter of the particle.

Thus, fine particles of porous hydroxyapatite which can satisfy all the properties of high percentage of voids, high specific surface and specific diameter of the micropore and a method for manufacturing thereof are required. Furthermore, since the porous hydroxyapatite can retain a superior properties and is easy to handle, and is a fine particle having superior dispersibility and specific diameter of the particle, the particles are expected to be used, not only as raw materials for bioceramics, but also in other many fields. As the fields for application, carriers for catalysts, pharmaceuticals, agricultural medicines, microbials, biologicals and peroxides, plant growth agents, absorbents of olefins, absorbents of ultraviolet, adsorbents, sustained-release materials, water-absorbing agents, raw materials for ceramics, many kind of carriers, filtering agents, filtering aids, growth for microbials, biological materials, drying agents, fragrants and other supports or raw materials thereof are exemplified. It is also expected to be used in plastics, rubbers, paints, inks, sealing materials, paper manufacture, fibers and films.

After extensive and intensive studies, the present inventors have found out novel fine particles of petaloid porous hydroxyapatite and method for manufacturing thereof, and thus accomplished the present invention based on these findings.

DISCLOSURE OF INVENTION

The present invention is, in a first aspect, directed to fine particles of petaloid porous hydroxyapatite which satisfy the following formulas (a)–(g) and which have an atomic ratio of Ca/P ranging from 1.62 to 1.72 and a chemical formula Ca$_5$(PO$_4$)$_3$(OH):

$0.2 \leq dx1 \leq 20 (\mu m)$ (a)

$1 \leq \alpha \leq 5$, where $\alpha = d50/dx1$ (b)

$0 \leq \beta \leq 2$, where $\beta = (d90-d10)/d50$ (c)

$0.01 \leq dx2 \leq 1 (\mu m)$ (d)

$95 \leq \omega 1 \leq 99$ (e)

$70 \leq \omega 2 \leq 95$ (f)

$50 \leq Sw1 \leq 500$ (g)

wherein:

dx1: Average particle diameter ($\mu$m) of the fine particles of petaloid porous hydroxyapatite measured by a photograph of an electron microscope;

α: Dispersion coefficient;

d50: 50% average particle diameter ($\mu$m) measured by a particle size distribution tester using a microtrack FRA laser;

β: Sharpness; a particle size distribution value; the smaller the value becomes, the sharper the distribution becomes;

d90: 90% particle diameter ($\mu$m) of the total fine particles of petaloid porous hydroxyapatite passed through a sieve measured by a particle size distribution tester using a microtrack FRA laser;

d10: 10% particle diameter ($\mu$m) of the total fine particles of petaloid porous hydroxyapatite passed through a sieve measured by a particle size distribution tester using a microtrack FRA laser;

dx2: Average micropore diameter ($\mu$m) of the fine particles of petaloid porous hydroxyapatite measured from a micropore distribution measured by a mercury penetration method;

ω1: Static percentage of voids (%) calculated from the following equation (h):

$$(h) \omega 1 = \left\{ 1 - \frac{1}{3.1 \times [\text{apparent specific volume}]} \right\} \times 100 (\%)$$

wherein the number of 3.1 is a specific gravity of hydroxyapatite, and wherein an apparent specific volume (ml/g) is measured according to a static method of pigment test of JIS K5101-91 20.1;

ω2: pressurized percentage of voids (%) calculated from the following equation (i):

$$(i) \omega 2 = \left\{ 1 - \frac{0.5}{3.1 \times 2 \times [\text{thickness}]} \right\} \times 100 (\%)$$

wherein the number of 3.1 is a specific gravity of hydroxyapatite, and wherein the thickness is measured by slide calipers after packing 0.5 g of a sample in a cylinder having a section of 2 cm$^2$, pressurizing the sample with a pressure of 30 kg/cm$^2$ for 30 seconds; and Sw1: BET specific surface m$^2$/g by a nitrogen adsorbing method.

The present invention is, in a second aspect, directed to a method for manufacturing fine particles of petaloid porous hydroxyapatite which comprises the steps of:

mixing in water an aqueous suspension dispersion of calcium carbonate having an average particle diameter of 0.1–5 $\mu$m measured by a particle size distribution tester of SA-CP3 manufactured by Shimadzu Corp., and a dilute aqueous solution of phosphoric acid and/or an aqueous suspension dispersion of calcium dihydrogen phosphate having an average particle diameter of 2–10$\mu$m measured by a particle distribution tester of SA-CP3 manufactured by Shimadzu Corp. and/or an aqueous suspension dispersion of calcium hydrogenphosphate.2H$_2$O having an average particle diameter of 2–10 $\mu$m measured by a particle distribution tester of SA-CP3 manufactured by Shimadzu Corp. so that an atomic ratio of Ca/P becomes 1.62–1.72 under the following mixing conditions, aging the resultant product under the following aging conditions, drying the aged product under drying conditions of not more than 700° C. after dehydration or without dehydration, and crushing the dried product;

Mixing conditions:

Solid concentration of the aqueous suspension dispersion of calcium carbonate: 1–15%;

Concentration of the dilute aqueous solution of phosphoric acid: 1–50%;

Solid concentration of the aqueous suspension dispersion of calcium dihydrogen phosphate: 2–15%;

Solid concentration of the aqueous suspension dispersion of calcium hydrogenphosphate.$2H_2O$: 2–15%;

Circumferential speed of a stirring blade: not less than 0.5 m/second;

Mixing time: 0.1–150 hours;

Temperature of the aqueous suspension: 0–80° C.

pH of the aqueous suspension: 5–9;

Aging conditions:

Calcium concentration: 0.4–5%;

Circumferential speed of a stirring blade: not less than 0.5 m/second;

Aging time: 0.1–100 hours;

Temperature of the aqueous suspension: 20–80° C.;

pH of the aqueous suspension: 6–9.

BEST MODE FOR CARRYING OUT THE INVENTION

Hereinafter, the present invention is explained in more detail.

The fine particles of petaloid porous hydroxyapatite of the present invention has an atomic ratio of Ca/P being 1.62–1.72 and has the chemical formula $Ca_5(PO_4)_3(OH)$. The fine particles are comprised of micropores having petaloid porous structure not only on the surface but also in inside of the particles, and has the particle diameter of the specific particle size, micropore diameter of the specific particle size, specific surface of the specific range, static percentage of voids of the specific range and pressurized percentage of voids of the specific range and has superior dispersibility.

Since the fine particles of petaloid porous hydroxyapatite are comprised of, not only on the surface but also inside of the particles, micropores which have a petaloid structure and a micropore diameter of the specific particle size, and therefore, as compared with porous hydroxyapatite composed of micropores which are formed by an aggregated structure of spherical particles, close-cropped particles and plate-like particles, the specific surface and the percentage of voids become large. Furthermore, since the fine particles have the particle diameter of the specific particle size with good dispersibility, the fine particles can retain the superior properties as described above and can be easily used in various uses. Moreover, the fine particles not only have high percentage of voids and good adsorbability and liquid-absorbability, but also retain the high pressurized percentage of voids even placed under pressure.

For example, it is possible to retain various kinds of useful materials in the petaloid micropore space, and conversely, it is possible to catch and remove the detrimental or harmful materials. Furthermore, if desired, it is possible that the fine particles of petaloid porous hydroxyapatite of the present invention can be molded by pressure so as to obtain pressure molded porous hydroxyapatite having a petaloid structure.

As the fields for application of the fine particles of petaloid porous hydroxyapatite of the present invention, carriers for catalysts, pharmaceuticals, agricultural medicines, microbials, biologicals and peroxides, plant growth agents, absorbents of olefins, absorbents of ultraviolet, adsorbents, sustained-release materials, liquids-absorbing agents, raw materials for ceramics, many kinds of carriers, filtering agents, filtering aids, growth for microbials, biological materials, drying agents, fragrants and other supports or raw materials thereof are exemplified.

It is also expected to be used in plastics, rubbers, paints, inks, sealing materials, paper manufactures and films.

In the case where the fine particles are used as a filler for plastics, rubbers and paints, since the particles have good dispersibility and since the organic materials are entered into the petaloid micropore space, as a result, affinity between the organic materials and the fine particles is enhanced. Since the affinity of the plastics, rubbers, paints, inks, sealing materials, paper manufactures, fibers and film compositions to which the fine particles of petaloid porous hydroxyapatite are filled is good, the compositions are expected to have good properties.

By filling in the plastics, rubbers, paints, inks, sealing materials and paper compositions, a complex composition of the carriers for catalysts, pharmaceuticals, agricultural medicines, microbials, biologicals and peroxides, plant growth agents, absorbents of olefins, absorbents of ultraviolet, adsorbents, sustained-release materials, liquids-absorbing agent, raw materials for ceramics, many kinds of carriers, filtering agents, filtering aids, growth for microbials, biological materials, drying agents, fragrants and other supports, to which the fine particles of petaloid porous hydroxyapatite are applied, complex effects and/or synergistic effects can be obtained.

In a plastic fiber and film, anti-blocking ability is important in its manufacturing process and in a field of use. In the manufacturing process, there is a stretching process in which the fiber or film is exposed to friction or abrasion when actually stretched. In this case, if affinity between an inorganic anti-blocking agent to be added and a plastic is bad, the inorganic anti-blocking agent is dropped out to thereby cause troubles. The organic materials mentioned above enter into the space of petaloid micropores, and as a result, it is suspected that the affinity becomes extremely good and that an effect of dispersing stresses raised by porous structure may be obtained, and thus the fine particles are expected to be useful as anti-blocking agents.

As the filtering agents, filtering aids and fillers of paper manufacture, the fine particles are expected to be useful because of their high specific surface and effect of the space of petaloid micropores.

It is preferable that the atomic ratio of Ca/P of the fine particles of petaloid porous hydroxyapatite ranges from 1.62 to 1.72. If the ratio is less than 1.62, calcium diphosphate, calcium phosphate, octacalcium phosphate and so on coexist and if the ratio is more than 1.72, unreacted $CaCO_3$ is remained, and therefore, the fine particles of petaloid porous hydroxyapatite with high purity cannot be obtained.

It is preferable that the average particle diameter d×1of the fine particles of petaloid porous hydroxyapatite measured by a photograph of an electron microscope is 0.2 $\mu$m or more and 20 $\mu$m or less. It is preferable that the average particle diameter is small since the outer specific surface of the particle becomes high. However, if the average particle diameter is smaller than 0.2 $\mu$m, the particles tend to aggregate since the particles themselves are small, and if the average particle diameter is larger than 20 $\mu$m, the particles tend to be destroyed during handling. The range is preferably 0.2 $\mu$m or more and 5 $\mu$m or less, more preferably 0.2 $\mu$m or more and 3 $\mu$m or less.

The dispersion coefficient $\alpha$ of the fine particles of petaloid porous hydroxyapatite is a value which is obtained by dividing the 50% average particle diameter measured by a particle size distribution tester using a microtrack FRA laser by the average particle diameter measured from a photograph of an electron microscope. It is preferable that α is near 1 because the particles are monodispersive particles. If the value becomes large, the particles become aggregated particles. Therefore, preferably, α is 1 or more and 5 or less. If α is more than 5, the dispersibility of the particles becomes worse. Preferably, α is 1 or more and 2 or less.

The sharpness β of the fine particles of petaloid porous hydroxyapatite is a value which is obtained by dividing a balance of d90 and d10 by the average particle diameter measured from a photograph of an electron microscope, wherein d90 and d10 are 90% and 10% particle diameters of the total particles passed through a sieve measured by a particle size distribution tester using a microtrack FRA laser, respectively. When the value β becomes near 0, the particle distribution becomes sharp and the particles become nearly monodispersive. It is preferable that β is 0 or more and 2 or less.

If β is more than 2, the dispersibility becomes worse. Preferably, β is 0 or more and 0.5 or less.

The average micropore diameter $dx2$ of the total fine particles of petaloid porous hydroxyapatite measured from a distribution of a micropore measured by a mercury penetration method is 0.01 $\mu$m or more and 1 $\mu$m or less. If $dX2$ is less than 0.01 $\mu$m, when the particles are used in above mentioned use, the particles are easy to adsorb the materials but easy to release them. Therefore, as a carrier for sustained-release materials, the ability of gradually releasing the adsorbed material over a long period of time is inferior. Moreover, since the micropore is too small, the porous particles are difficult to be used as filtering agents, filtering aids and so on. The particles are also difficult to adsorb and to sustainable release liquids with high surface tension, materials with inferior wettability, high viscous materials and high molecular weight materials. If $dx2$ is more than 1 $\mu$m, the micropores are likely to be destroyed. Preferably, $dx2$ is 0.02 $\mu$m or more and 0.5 $\mu$m or less.

The static percentage of voids $\omega1(\%)$ of the fine particles of petaloid porous hydroxyapatite that is calculated from the method described below is preferable, as $\omega1$ becomes higher. Preferably, $\omega1$ is 95% or more and 99% or less. If $\omega1$ is lower than 95%, the percentage of voids cannot be said to be high. If $\omega1$ is over 99%, handling in storage and transportation becomes worse.

$\omega1$ is calculated from the following equation (h):

$$(h)\omega1 = \left\{1 - \frac{1}{3.1 \times [\text{apparent specific volume}]}\right\} \times 100 (\%)$$

wherein the number of 3.1 is a specific gravity of hydroxyapatite, and wherein an apparent specific volume (ml/g) is measured according to a static method of pigment test of JIS K5101-91 20.1.

The pressurized percentage of voids $\omega2(\%)$ of the fine particles of petaloid porous hydroxyapatite that is calculated from the method described below is preferable, as $\omega2$ becomes higher. Preferably, $\omega2$ is 70% or more and 95% or less.

If $\omega2$ is less than 70%, the difference between the static percentage of voids $\omega1$ and the pressurized percentage of voids $\omega2$ becomes large. Therefore, when pressure is added, the percentage of voids tends to decrease. On the other hand, if $\omega2$ is over 95%, not only the preparation of the particles becomes difficult, but also the pressure moldability lowers.

$\omega2$ is a pressurized percentage of voids (%) calculated from the following equation (i):

$$(i)\omega2 = \left\{1 - \frac{0.5}{3.1 \times 2 \times [\text{thickness}]}\right\} \times 100(\%)$$

wherein the number of 3.1 is a specific gravity of hydroxyapatite, and wherein the thickness is measured by slide calipers after packing 0.5 g of a sample in a cylinder having a section of 2 cm$^2$, pressurizing the sample with a pressure of 30 kg/cm$^2$ for 30 seconds.

In a case where the fine particles of petaloid porous hydroxyapatite are used in the various ways, especially such as many kinds of carriers, absorbants and so on, it is preferable that the Sw1, the specific surface measured by a nitrogen adsorbing method, is high. The value is 50 m$^2$/g or more and 500 m$^2$/g or less. Preferably, the value is 100 m$^2$/g or more and 450 m$^2$/g or less, and more preferably, 150 m$^2$/g or more and 400 m$^2$/g or less. If the specific surface is over 500 m$^2$/g, it is not possible to control the absorbance and sustained-release of the materials as a carrier. If the value is less than 50 m$^2$/g, the adsorbing ability is not sufficient.

The fine particles of petaloid porous hydroxyapatite of the present invention can be manufactured by mixing the specific aqueous suspension dispersion of the calcium carbonate and the diluted aqueous solution of phosphate and/or the specific aqueous suspension dispersion of calcium dihydrogen phosphate and/or specific aqueous suspension dispersion of calcium hydrogenphosphate.2H$_2$O at a specific ratio under the specific mixing conditions, aging under the specific aging conditions, thereafter drying by the specific method.

Hereinafter, the method for manufacturing the fine particles of petaloid porous hydroxyapatite is described in greater detail.

A method for manufacturing fine particles of petaloid porous hydroxyapatite which comprises the steps of:

mixing in water an aqueous suspension dispersion of calcium carbonate having an average particle diameter of 0.1–5 $\mu$m measured by a particle size distribution tester of SA-CP3 manufactured by Shimadzu Corp., and a dilute aqueous solution of phosphoric acid and/or an aqueous suspension dispersion of calcium dihydrogen phosphate having an average particle diameter of 2–10 $\mu$m measured by a particle distribution tester of SA-CP3 manufactured by Shimadzu Corp. and/or an aqueous suspension dispersion of calcium hydrogenphosphate.2H$_2$O having an average particle diameter of 2–10 $\mu$m measured by a particle distribution tester of SA-CP3 manufactured by Shimadzu Corp. so that an atomic ratio of Ca/P becomes 1.62–1.72 under the following mixing conditions, aging the resultant product under the following aging conditions, drying the aged product under drying conditions of not more than 700° C. after dehydration or without dehydration, and crushing the dried product;

Mixing conditions:
  Solid concentration of the aqueous suspension dispersion of calcium carbonate: 1–15%;
  Concentration of the dilute aqueous solution of phosphoric acid: 1–50%;
  Solid concentration of the aqueous suspension dispersion of calcium dihydrogen phosphate: 2–15%;
  Solid concentration of the aqueous suspension dispersion of calcium hydrogenphosphate.2H$_2$O: 2–15%;
  Circumferential speed of a stirring blade: not less than 0.5 m/second;

Mixing time: 0.1–150 hours;

Temperature of the aqueous suspension: 0–80° C.;

pH of the aqueous suspension: 5–9;

Aging conditions:

Calcium concentration: 0.4–5%;

Circumferential speed of a stirring blade: not less than 0.5 m/second;

Aging time: 0.1–100 hours;

Temperature of the aqueous suspension: 20–80° C.;

pH of the aqueous suspension: 6–9.

A measurement of the particle size distribution of the aqueous suspension dispersion of calcium carbonate used in the present invention and a calculation of the distribution are as follows:

Particle size distribution tester: SA-CP3 manufactured by Shimadzu Corp.;

Preparation of samples: aqueous suspension dispersions of the samples are dropped into the following solvent at 25° C. so as to make a sample for particle size distribution measurement;

Solvent: aqueous solution made by dissolving 0.004% by weight of sodium polyacrylate in ion-exchanged water;

Pre-dispersion: ultrasonic dispersion for 100 seconds using BRANSON 1200(made by Yamato Co. Ltd.)

Measuring temperature: 20° C.±2.5° C.

It is preferable that the average particle diameter measured by the particle size distribution tester of SA-CP3 manufactured by Shimadzu Corp. is small, and it is preferably 0.1–5 μm. If the value is below 0.1 μm, the particles are difficult to prepare. If the value is over 5 μm, not only OCP (octacalcium phosphate) and so on, which are calcium phosphates other than hydroxyapatite tend to be produced, but also the percentage of voids and specific surface tend to lower. Calcium carbonate in the aqueous suspension dispersion of calcium carbonate can be either heavy calcium carbonate or synthetic calcium carbonate, however, calcium carbonate which is manufactured by wet synthetic method and has an average particle diameter of 0.01–0.2 μm which is measured by the photograph of the electron microscope is preferable, and further, calcium carbonate having an average particle diameter of 0.01–0.07 μm measured by the photograph of the electron microscope is more preferable.

The method for preparing the aqueous suspension dispersion of calcium carbonate include, one or two kinds of methods selected from stirring, still standing, washing with water, ultrasonic dispersion, wet-crushing using a medium, impact-wet-dispersion without a medium and so on. As a preferable method, the Japanese laid-open patent publication No.5-319815 entitled "Preparation of calcium carbonate dispersion" is exemplified.

The average particle diameter of the aqueous suspension dispersion of calcium carbonate measured by the particle size distribution tester can be 0.1–1 μm. A small number of total % of the particles having an average particle diameter of 5 μm or more measured by the particle size distribution tester is preferable, 0% is more preferable.

The calcium carbonate in the aqueous suspension dispersion of calcium carbonate can be any crystalline form of calcite, aragonite and vaterite, and a particle form of the calcium carbonate can be any form of sphere, dice (cube), spindle, needle or plate.

The solid concentration of aqueous suspension dispersion of calcium carbonate can be 1–15%. The fine particles of petaloid porous hydroxyapatite can be manufactured even when the solid concentration is less than 1%, however, there raise economical problems such as need of a large amount of water or a large reaction vessel and so on. If the concentration is more than 15%, viscosity of the mixture becomes high at the end of the mixing or during mixing, and therefore, stirring of the mixture may be insufficient. The concentration of 3–10% is more preferable. In the case where the viscosity of the aqueous suspension dispersion of calcium carbonate is so high that the stirring is insufficient, it is preferable that the aqueous suspension dispersion of calcium carbonate is diluted since the mixing tends to be non-uniform. More preferably, the viscosity of the aqueous suspension dispersion of calcium carbonate is 20 poise or less, and further preferably, 5 poise or less.

The phosphoric acid concentration of the dilute aqueous solution can be 1–50%. The fine particles of petaloid porous hydroxyapatite can be manufactured even when the phosphoric acid concentration is less than 1%, however, there raise economical problems such as need of a large amount of water or a large reaction vessel and so on. If the concentration is more than 50%, a part of the mixture becomes acidic upon mixing, thereby producing an acidic calcium phosphate other than hydroxyapatite or causing the reaction mixture uneven. Preferably, the concentration is 2–20%.

It is preferable that the average particle diameter of the aqueous suspension dispersion of calcium dihydrogen phosphate measured by the particle size distribution tester of SA-CP3 manufactured by Shimadzu Corp. is small, and it is preferably 2–10 μm. If it is less than 2 μm, a large amount of extremely minute particles are contained, and thus hydroxyapatite of extremely minute particles tend to be produced. If it is over 10 μm, not only OCP (octacalcium phosphate) and so on, which are calcium phosphates other than hydroxyapatite tend to be produced, but also the percentage of voids and specific surface tend to lower. The range of 2–5 μm is preferable.

The solid concentration of the aqueous suspension dispersion of calcium dihydrogen phosphate can be 2–15%. The fine particles of petaloid porous hydroxyapatite can be manufactured even when the solid concentration is less than 2%, however, there raise economical problems such as need of a large amount of water or a large reaction vessel and so on. If the concentration is over 15%, OCP and so on which are calcium phosphates other than hydroxyapatite tend to be produced. The range of 3–10% is preferable.

It is preferable that the average particle diameter of the aqueous suspension dispersion of calcium hydrogenphosphate.$2H_2O$ measured by the particle size distribution tester of SA-CP3 manufactured by Shimadzu Corp. is small, and it is preferably 2–10 μm. Since particles having mean particle diameter of less than 2 μm contain many highly minute particles, hydroxyapatite of highly minute particles tend to be produced. If it is over 10 μm, not only OCP (octacalcium phosphate) and so on, which are calcium phosphates other than hydroxyapatite tend to be produced, but also the percentage of voids and specific surface tend to lower. The range of 2–5 μm is preferable.

The solid concentration of the aqueous suspension dispersion of calcium hydrogenphosphate.$2H_2O$ can be 2–15%. The fine particles of petaloid porous hydroxyapatite can be manufactured even when the solid concentration is less than 2%, however, there raise economical problems such as need of a large amount of water or a large reaction vessel and so on. If the concentration is over 15%, OCP and so on which are calcium phosphates other than hydroxyapatite tend to be produced. The range of 3–10% is preferable.

The mixing method is not limited as far as the method satisfies the mixing conditions. However, it is preferable that, under the specific mixing conditions, to the specific aqueous suspension dispersion of calcium carbonate, the diluted aqueous solution of phosphoric acid and/or the specific aqueous suspension dispersion of calcium dihydrogen phosphate and/or the specific aqueous suspension dispersion of calcium hydrogenphosphate.$2H_2O$ are added dropwise gradually under stirring and mixed. It is more preferable that the dilute aqueous solution of phosphoric acid is added dropwise gradually under stirring to the specific aqueous suspension dispersion of calcium carbonate.

Regarding the mixing ratio, if the Ca/P atomic molar ratio is less than 1.62, calcium phosphates other than hydroxyapatite can be mixed, and if the ratio is more than 1.72, unreacted $CaCO_3$ can be remained. Therefore, the fine particles of petaloid porous hydroxyapatite with high purity can not be obtained.

There is a tendency that the higher the circumferential speed of the stirring blade upon mixing becomes, the smaller the particle diameter of the fine particles of petaloid porous hydroxyapatite to be produced becomes. The circumferential speed can be 0.5 meter/second or more, preferably, 3 m/second or more, and more preferably, 6–10 meter/second. The circumferential speed of more than 10 m/second is not preferable because a large amount of energy is required for stirring and the particle size of the particles to be produced tends to be uneven. If the circumferential speed is less than 0.5 m/sec, the mixing is insufficient and therefore, the reaction becomes uneven.

The mixing time can be 0.1–150 hours. If the mixing time is less than 0.1 hour, the mixing is insufficient. The mixing time over 150 hours is not economical and the specific surface tends to lower. The mixing for 0.3–100 hours is preferable, and the mixing for 2–48 hours is more preferable.

The mixing can be ceased halfway in the reaction so as to allow intermediate aging or leaving the mixture to stand for rest. Even in the period where mixing is stopped, there is a tendency that the specific surface can be decreased as the liquid temperature raises. Therefore, the temperature can be controlled to 50° C. or less, preferably 35° C. or less. Further, the stopping period can be within 48 hours, preferably, 35° C. or less and within 48 hours.

The temperature of the aqueous suspension upon mixing can be 0–80° C. If the temperature is less than 0° C., the aqueous suspension tends to freeze and the cooling is difficult. If the temperature is over 80° C., not only a large amount of energy for increasing or maintaining the temperature is necessary, but also OCP which is a calcium phosphate other than hydroxyapatite tends to be produced and the specific surface tends to decrease. The temperature of 10–60° C. is preferable, and 10–35° C. is more preferable.

The predetermined pH of the aqueous suspension when the mixing is completed can be 5.0–9.0. If the pH of the aqueous suspension is below 5.0, acidic calcium phosphates other than hydroxyapatite tend to be produced in the next step of aging. If the pH is over 9, in the aging of the next step, a long period for crystallization growth may be required because the speed for crystallization of hydroxyapatite is dropped. The preferable pH is 6–8.

By maintaining the pH constant upon mixing of the phosphoric acid, the particle size of the fine particles of petaloid porous hydroxyapatite can be controlled. That is, the higher the pH of the mixture becomes, the smaller the particle size of the fine particles of petaloid porous hydroxyapatite tends to become. Further, if the pH of the mixture maintained constant, the monodispersed fine particles of petaloid porous hydroxyapatite tend to be produced.

After mixing, aging can be done under specific aging conditions. The purpose of the aging is to complete the synthesis of hydroxyapatite and to grow and/or stabilize the pataloid structure.

The calcium concentration upon aging can be 0.4–5%. The fine particles of petaloid porous hydroxyapatite can be manufactured even when the calcium concentration is less than 0.4%, however, there raise economical problems such as need of a large amount of water or a large reaction vessel and so on. If the concentration is more than 5%, viscosity of the mixture becomes high at the end of aging or during mixing, and therefore, stirring of the mixture may be insufficient.

The temperature of the aqueous suspension upon aging can be 20–80° C. If the temperature is below 20° C., the aging time becomes long. If the temperature is over 80° C., not only a large amount of energy is required, but also the specific surface is decreased. The temperature of 25–60° C. is preferable, and 25–40° C. is more preferable.

The aging time can be 0.1–100 hours. If the time is less than 0.1 hour, the aging may be insufficient. Moreover, since the free ions still exist in the aging system, synthesis of the hydroxyapatite is incomplete. If the time is over 100 hours, it is not economical and the specific surface tends to be decreased. The time of 1–48 hours is preferable.

The circumferential speed of the stirring blade upon aging can be 1 meter/second or more, and preferably, 3 m/second or more, and further preferably, 6 meter/second or more. During the aging, the uniformity in the system is important, and therefore, since the uniformity can be extremely decreased, the circumferential speed less than 1 m/second is not preferable.

The pH of the aqueous suspension at the end of aging can be 5–9. If the pH is less than 5, acidic calcium phosphates other than hydroxyapatite tend to remain, and if the pH is over 9, unreacted calcium carbonate remains. The pH of 7–8.5 is preferable.

Drying is performed after the aging, however, since there is a tendency that the specific surface can be decreased by heat during the drying process, the short drying time is preferable.

It is preferable that the drying efficiency can be increased by dehydration and washing (including concentration). However, it is not preferable that the handling becomes worse by dehydration, and that the average thickness of a layer of materials to be dried, i.e., a layer of the aged product to be dried or the average particle diameter of lumps of materials to be dried, i.e., lumps of the aged product to be dried becomes large in the course of drying. Therefore, it is preferable that the dehydration ratio or concentration ratio can be decided in accordance with a drying apparatus employed.

Further, the average thickness of a layer of materials to be dried or the average particle diameter of the lumps of materials to be dried is preferably 10000 µm, and more preferably, 1000 µm or less.

Further, it is preferable that a drying time necessary for a heat decrease of weight of the dried powder being 10% or less when heated at 200° C. for 2 hours is as short as possible. Such drying time of 1 to 120 seconds is preferable, more preferably 1–40 seconds, and further preferably 1–10 seconds.

Furthermore, as a drier, a hot air transporting dryer such as a spray drier and an airborne dryer is preferably used since such a drier can satisfy the above preferable conditions.

As a method for increasing the efficiency of drying, when dehydrating (including concentration), a solvent or a mixed solvent of two or more kinds of solvents selected from the group consisting of lower alcohols such as methanol and ethanol and lower alkyl ethers such as ether, can be used for washing and/or can be added. Further, the washed solvent which was resulted after the use (filtrate) can be distilled and purified so as to reuse the effective ingredient.

The amount of use can be 5–1000% with respect to a water content of the suspension after aging or the dehydrated lumps of materials.

The amount of less than 5% is not preferable since the effect of increasing the efficiency of drying can not be obtained. The amount of over 1000% is not preferable because a treatment of the washed solvent (filtrate) becomes troublesome. The amount of 10– 500% is preferable, and 20–300% is more preferable.

Hereinafter, the present invention will be explained in more detail in accordance with examples, however, the present invention is not limited to the examples, and variations may be made without departing from the gist of the present invention.

The preparation of aqueous suspension dispersions of calcium carbonate A1–A5, aqueous suspensions of calcium carbonate B1–B3, an aqueous suspension dispersion of calcium hydrogenphosphate.$2H_2O$ C1 and an aqueous dispersion of calcium dihydrogen phosphate C2, and aqueous suspensions of calcium hydrogenphosphate.$2H_2O$ D1 and D2 that are used in Examples and Comparative examples will be described below.

Aqueous Suspension Dispersion of Calcium Carbonate A1

Into 7,000 liters of a mild of lime (an aqueous suspension of calcium hydroxide) having a specific gravity of 1.055 and a temperature of 8° C., a furnace gas containing carbon dioxide of 27% by weight was introduced at a rate of 24 $m^3$. The carbonating reaction was performed until a pH of the aqueous suspension became 9, followed by aging at 40–50° C. for 5 hours with stirring. During the aging, alkali in the space of the particles was eluted out and the particles were dispersed at pH 10.8, thereby preparing an aqueous suspension dispersion of calcium carbonate A1.

Aqueous Suspension Dispersion of Calcium Carbonate A2

Into 7,000 liters of a milk of lime having a specific gravity of 1.055 and temperature of 8° C., a furnace gas containing carbon dioxide of 27% by weight was introduced at a rate of 24 $m^3$. The carbonating reaction was performed until a pH of the aqueous suspension became 6.5, thereby preparing an aqueous suspension dispersion of calcium carbonate A2.

Aqueous Suspension Dispersion of Calcium Carbonate A3

The aqueous suspension dispersion of calcium carbonate A2 was dehydrated by a filter press, dried by a paddle dryer, crushed by an atomizer so as to make a powder. Then, water was added to the powder and mixed, and the mixture was stirred and dispersed by TK homomixer (5000 rpm, 15 min.) to thus obtain an aqueous suspension of calcium carbonate with a solid concentration of 25%, followed by wet crushing by using a wet crusher Dynomill Pilot type (manufactured by WAB Co. Ltd.), 80% of which was filled with glass beads having an average particle diameter of 0.8 mm, thereby preparing an aqueous dispersion suspension of calcium carbonate A3.

Aqueous Suspension Dispersion of Calcium Carbonate A4

Carbon dioxide was passed through the aqueous suspension dispersion of calcium carbonate A1 and subjected to aging with stirring at 50–60° C. for 24 hours while maintaining the pH of 10.0–10.8, to thus prepare an aqueous suspension dispersion of calcium carbonate A4 whose primary particle diameter is larger than the aqueous suspension dispersion of calcium carbonate A1.

(d) Aqueous Suspension Dispersion of Calcium Carbonate A5

To Calcium carbonate heavy "Super SSS" (1.2 $m^2/g$) made by Maruo Calcium Co., Ltd., water was added. After mixing, the calcium carbonate was stirred and dispersed using TK homomixer (5000 rpm, 15 min.) so as to prepare an aqueous suspension dispersion of calcium carbonate A5 having a solid concentration of 25%.

The properties of the aqueous suspension dispersions of calcium carbonate A1–A5 are shown in Table 1.

TABLE 1

| Aq. suspension dispersion of calcium carbonate | A1 | A2 | A3 | A4 | A5 |
|---|---|---|---|---|---|
| Average particle diameter measured by a photograph of an electron microscope μm | 0.05 | 0.05 | 0.05 | 0.10 | 3.0 |
| Average particle diameter measured by a particle size distribution μm | 0.48 | 4.28 | 0.30 | 0.75 | 3.4 |
| Total % of particles of not less than 5 μm measured by a particle size distribution % | 0.0 | 15.1 | 0.0 | 0.0 | 32.9 |

Aqueous Suspension of Calcium Carbonate B1

To heavy calcium carbonate "R heavy calcium carbonate" (0.3 $m^2/g$) made by Maruo Calcium Co., Ltd., water was added and mixed so as to prepare an aqueous suspension of calcium carbonate B1 having a solid concentration of 25%.

The particle size distribution was measured by a multi-mode system using natural precipitation in combination.

Aqueous Suspension of Calcium Carbonate B2

To calcium carbonate of a reagent special grade "calcium carbonate (made by precipitation method)" manufactured by Wako Junyaku Kogyo Co., Ltd., water was added and mixed so as to prepare an aqueous suspension of calcium carbonate B2 having a solid concentration of 25%.

Aqueous Suspension of Calcium Carbonate B3

To colloid calcium carbonate "Korokaruso" manufactured by Shiraishi Kogyo Co., Ltd., water was added and mixed so as to prepare an aqueous suspension of calcium carbonate B3 having a solid concentration of 25%.

The properties of the aqueous suspension dispersions of calcium carbonate B1–B3 are shown in Table 2.

TABLE 2

| Aq. suspension dispersion of calcium carbonate | B1 | B2 | B3 |
|---|---|---|---|
| Average particle diameter measured by a photograph of an electron microscope μm | 15.0 | 4.5 | 0.07 |
| Average particle diameter measured by a particle size distribution μm | 24.89 | 6.42 | 5.91 |
| Total % of particles of not less than 5 μm measured by a particle size distribution % | 93.7 | 73.4 | 55.2 |

<Aqueous suspension dispersion of calcium hydrogenphosphate · $2H_2O$ C1>

Calcium hydrogenphosphate.$2H_2O$ manufactured by Taihei Kagaku Kogyo Co., Ltd. was crushed using an atomizer to adjust a particle size, followed by addition of water. After mixing, the suspension was stirred and dispersed using TK homomixer (5000 rpm, 15 min.) so as to prepare an aqueous suspension dispersion of calcium hydrogenphosphate.$2H_2O$ C1 with a solid concentration of 25%.

Aqueous Suspension Dispersion of Calcium Dihydrogen Phosphate C2

Calcium dihydrogen phosphate manufactured by Taihei Kagaku Kogyo Co., Ltd. was crushed using an atomizer to adjust a particle size, followed by addition of water. After mixing, the suspension was stirred and dispersed using TK homomixer (5000 rpm, 15 min.) so as to prepare an aqueous suspension dispersion of calcium dihydrogen phosphate C2 with a solid concentration of 25%.

Aqueous Suspension Dispersion of Calcium Hydrogenphosphate.2H$_2$O D1

To calcium hydrogenphosphate.2H$_2$O manufactured by Taihei Kagaku Kogyo Co., Ltd., water was added. After mixing, the suspension was stirred and dispersed using TK homomixer (5000 rpm, 15 min.) so as to prepare an aqueous suspension of calcium hydrogenphosphate.2H$_2$O with a solid concentration of 25%, followed by wet crushing by using a wet crusher Dynomil pilot type (manufactured by WAB Co. Ltd.), 80% of which was filled with glass beads having an average particle diameter of 0.8 mm, thereby preparing an aqueous suspension dispersion of calcium hydrogenphosphate.2H$_2$O D1.

Aqueous Suspension Dispersion of Calcium Hydrogenphosphate.2H$_2$O D2

To calcium hydrogenphosphate.2H$_2$O manufactured by Taihei Kagaku Kogyo Co., Ltd., water was added and mixed so as to prepare an aqueous suspension dispersion of calcium hydrogenphosphate.2H$_2$O with a solid concentration of 25%.

The properties of the aqueous suspension dispersion of calcium hydrogenphosphate.2H$_2$O C1, the aqueous suspension dispersion of calcium dihydrogen phosphate C2 and the aqueous suspension dispersions of calcium hydrogenphosphate.2H$_2$O D1 and D2 are shown in Table 3.

TABLE 3

| Aq. suspension dispersions of calcium hydrogenphosphate · 2H$_2$O | C1 | | D1 | |
|---|---|---|---|---|
| Aq. suspension dispersion of calcium dihydrogen phosphate | | C2 | | |
| Aq. suspension dispersions of calcium hydrogenphosphate · 2H$_2$O | | | | D2 |
| Total % of particles of not less than 5 μm measured by a particle size distribution | 7.5 | 8.2 | 1.5 | 21.0 |

EXAMPLES 1–15

According to raw materials and mixing conditions shown in Tables 4–6, into a 0.4 m$^3$ stainless steel tank equipped with baffle plates and a stirrer with a turbine blade having a diameter of 0.6 m, an aqueous suspension dispersion of calcium carbonate which was diluted and adjusted in concentration and temperature was introduced. Under mixing, a dilute aqueous solution of phosphoric acid and/or an aqueous suspension dispersion of calcium hydrogenphosphate.2H$_2$O were dropped into the tank and mixed so that are atomic ratio of Ca/P become 1.67. After the pH of the mixture of the aqueous suspensions was adjusted to that of the termination of mixing shown in Tables 4–6, mixation was stopped, and the aging was performed under conditions shown in Tables 4–6 with stirring. Then, a supernatant was removed by decantation and the resultant product was concentrated to a solid concentration of 8%, followed by spray drying, thereby preparing particles E1–E15. Total amount of the raw materials and water was 400 kg. Spray drying conditions were as follows: particle diameter when spraying: about 0.1 mm; temperature of hot air at the inlet:250° C.; drying time: about 10 seconds; and decrease of weight of the dried product immediately after drying when heated at 200° C. for 2 hours: 5–8%.

Properties of the particles E1–E15 prepared in Examples 1–15 are shown in Tables 9–11. Compounds identified by X-ray diffraction were shown below as their abbreviations in an order of high contents from up to down.

| Abbreviation | Chemical formula | JCPDS No. | Name |
|---|---|---|---|
| HAP | Ca$_5$(PO$_4$)$_3$(OH) | 9- 432 | hydroxyapatite |
| TCP | Ca$_3$(PO$_4$)$_2$.XH$_2$O | 18- 303 | calcium triphosphate hydrate |
| OCP | Ca$_8$(PO$_4$)$_6$.5H$_2$O | 26-1056 | octacalcium phosphate |
| DCPD | CaHPO$_4$.2H$_2$O | 9- 77 | calcium hydrogenphosphate 2H$_2$O |
| CaCO$_3$ | CaCO$_3$ | 5- 586 | calcite (calcium carbonate) |

Further, the particles are hydroxyapatite having an atomic ratio of Ca/P of 1.62–1.72 and the chemical formula Ca$_5$(PO$_4$)$_3$(OH) determined from X-ray diffraction, and from the photograph of the electron microscope, the particles are novel fine particles of petaloid porous hydroxyapatite that are comprised of micropores having a petaloid structure not only on the surface but also inside of the particles, and have the particle diameter of the specific particle size, micropore diameter of the specific particle size, specific surface of the specific range, static percentage of voids of the specific range and pressurized percentage of voids of the specific range.

EXAMPLE 16

To the completion of aging, the same manner as in Example 1 was repeated. After the aging, the product was dehydrated by centrifugation thereby preparing a dehydrated cake. The dehydrated cake was crushed by an atomizer so as to make aggregates of the dehydrated cake. The aggregates of the dehydrated cake were dried by a micron dryer and crushed by an atomizer, and thus particles E16 were prepared. Drying conditions of the micron dryer were as follows: particle diameter of the aggregates of the dehydrated cake: 10– 100 mm; temperature of hot air at the inlet: 250° C.; drying time: about 20 seconds; and decrease of weight of the dried product immediately after drying when heated at 200° C. for 2 hours: 6%. Properties of the particles E16 prepared in Example 16 are shown in Table 11. Although the particles E16 obtained in Example 16 have smaller specific surface and static percentage of voids as compared with those of particles E1 obtained in Example 1, the particles E16 were novel fine particles of petaloid porous hydroxyapatite that were similar to E1.

EXAMPLE 17

To the completion of aging, the same manner as Example 1 was repeated. After the aging, the product was dehydrated by centrifugation thereby preparing a dehydrated cake, then aggregates of the dehydrated cake were prepared, dried by a box-type hot air dryer and crushed by an atomizer, and thus particles E17were prepared. Drying conditions were as follows: particle diameter of the aggregates of the dehydrated cake: 10–100 mm; temperature of drying: 100° C.; drying time: about 20 hours; and decrease of weight of the dried product immediately after drying when heated at 200° C. for 2 hours: 6%. Properties of the particles E17prepared in Example 17 are shown in Table 11. Although the particles E17obtained in Example 17 have smaller specific surface and static percentage of voids as compared with those of particles E1obtained in Example 1, the particles E17were novel fine particles of petaloid porous hydroxyapatite that were similar to E1.

EXAMPLE 18

To the completion of aging, the same manner as Example 1 was repeated. After the aging, the stirring was stopped and a supernatant was removed by decantation and the resultant product was concentrated to a solid concentration of 8%, followed by addition of methanol in an amount of corresponding to 100% of water content of the concentrated slurry and spray drying, thereby preparing particles E18. Total amount of the raw materials and water and methanol was 400 kg.

Spray drying conditions were as follows: particle diameter when spraying: about 0.1 mm; temperature of hot air at the inlet: 250° C.; drying time: about 10 seconds; and decrease of weight of the dried product immediately after drying when heated at 200° C. for 2 hours: 2–8%. Methanol recovered in the process of spray drying can be reused after purification by a suitable method. Properties of the particles E18prepared in Example 18 are shown in Table 11. The particles E18obtained in Example 18 were novel fine particles of petaloid porous hydroxyapatite that were similar to E1obtained in Example 1 and have higher specific surface and static percentage of voids than those of E1.

EXAMPLE 19

To the completion of aging, the same manner as Example 1 was repeated. After the aging, the product was dehydrated by centrifugation thereby preparing a dehydrated cake, then aggregates of the dehydrated cake were dehydrated and washed with methanol in an amount corresponding to 50% of water content of the aggregates of the dehydrated cake. The methanol-dehydrated cake was crushed by a double mixer so as to make aggregates of the dehydrated cake, and then dried by a micron dryer, followed by crushing by an atomizer, and thus particles E19were prepared. Drying conditions of the micron dryer were as follows: particle diameter of the aggregates of the dehydrated cake: 10–100 mm; temperature of hot air at the inlet: 250° C.; drying time: about 20 seconds; and decrease of weight of the dried product immediately after drying when heated at 200° C. for 2 hours: 5%. Properties of the particles E19prepared in Example 19 are shown in Table 11. The particles E19obtained in Example 19 were novel fine particles of petaloid porous hydroxyapatite that were similar to E1and have higher specific surface and static percentage of voids those of particles E1obtained in Example 1.

EXAMPLE 20

To the completion of aging, the same manner as Example 1 was repeated. After the aging, the product was dehydrated by centrifugation thereby preparing a dehydrated cake, then aggregates of the dehydrated cake were dehydrated and washed with methanol in an amount corresponding to 50% of water contained in the aggregates of the dehydrated cake, dried by a box-type hot air dryer and crushed by an atomizer, and thus, particles E20were prepared. Drying conditions were as follows: particle diameter of the aggregates of the dehydrated cake: 10–100 mm; temperature of drying: 100° C.; drying time: about 10 hours; and decrease of weight of the dried product immediately after drying when heated at 200° C. for 2 hours: 3%. Properties of the particles E20prepared in Example 20 are shown in Table 11. The particles E20obtained in Example 20 were novel fine particles of petaloid porous hydroxyapatite that were similar to E1and have higher specific surface and static percentage of voids than those of particles E1obtained in Example 1.

TABLE 4

| Examples | 1 | 2 | 3 | 4 | 5 |
|---|---|---|---|---|---|
| Kind of aq. suspension dispersion of calcium carbonate | A1 | A2 | A3 | A4 | A5 |
| Solid conc. of aq. suspension dispersion of calcium carbonate after prepared % | 8 | 8 | 8 | 8 | 8 |
| Solid conc. of dilute aq. solution of phosphoric acid % | 5 | 5 | 5 | 5 | 5 |
| Mixing system: | | | | | |
| Time hr | 2.5 | 2.5 | 2.5 | 2.5 | 72 |
| Temp. of aq. suspension °C. | 27 | 27 | 27 | 27 | 35 |
| pH of aq. suspension | 5.5–6 | 5.5–6 | 5.5–6 | 5.5–6 | 5.5–6 |
| Circumferential speed of stirring blade m/sec. | 1.0 | 1.0 | 1.0 | 1.0 | 1.0 |
| Aging system: | | | | | |
| Ca conc. % | 1.7 | 1.7 | 1.7 | 1.7 | 1.7 |
| Time hr | 48 | 48 | 48 | 48 | 12 |
| Temp. of aq. suspension °C. | 27 | 27 | 27 | 27 | 50 |
| pH of aq. suspension | 6.5–8 | 6.5–8 | 6.5–8 | 6.5–8 | 6.5–8 |
| Circumferential speed of stirring blade m/sec. | 1.0 | 1.0 | 1.0 | 1.0 | 1.0 |

TABLE 5

| Examples | 6 | 7 | 8 | 9 | 10 |
|---|---|---|---|---|---|
| Kind of aq. suspension dispersion of calcium carbonate | A1 | A3 | A3 | A1 | A1 |
| Solid conc. of aq. suspension dispersion of calcium carbonate after prepared % | 12 | 8 | 8 | 8 | 8 |
| Solid conc. of dilute aq. solution of phosphoric acid % | 30 | 5 | 5 | 5 | 5 |
| Mixing system: | | | | | |
| Time hr | 2.5 | 2.5 | 2.5 | 2.5 | 0.5 |
| Temp. of aq. suspension °C. | 27 | 27 | 27 | 27 | 70 |
| pH of aq. suspension | 5.5–6 | 6–6.5 | 6.5–7 | 5.5–6 | 5.5–6 |
| Circumferential speed of stirring blade m/sec. | 1.0 | 3.0 | 6.0 | 1.0 | 1.0 |
| Aging system: | | | | | |
| Ca conc. % | 3.9 | 1.7 | 1.7 | 1.7 | 1.7 |
| Time hr | 48 | 24 | 24 | 72 | 36 |
| Temp. of aq. suspension °C. | 27 | 27 | 27 | 50 | 27 |
| pH of aq. suspension | 6.5–8 | 7.5–8 | 7.5–8 | 7.8 | 7.8 |
| Circumferential speed of stirring blade m/sec. | 1.0 | 3.0 | 6.0 | 1.0 | 1.0 |

TABLE 6

| Examples | 11 | 12 | 13 | 14 | 15 |
|---|---|---|---|---|---|
| Kind of aq. suspension dispersion of calcium carbonate | A1 | A1 | A1 | A1 | A1 |
| Solid conc. of aq. suspension dispersion of calcium carbonate after prepared % | 8 | 8 | 8 | 8 | 12 |
| Solid conc. of dilute aq. solution of phosphoric acid % | | | 5 | | |
| Kind of aq. suspension dispersion of calcium hydrogenphosphate · 2H$_2$O | C1 | C1 | C1 | | |
| Solid conc. of aq. suspension dispersion of calcium hydrogenphosphate · 2H$_2$O | 5.5 | 5.5 | 5.5 | | |
| Kind of aq. suspension dispersion of calcium dihydrogen phosphate | | | | C2 | C2 |
| Solid conc. of aq. suspension dispersion of calcium dihydrogen phosphate | | | | 5.5 | 5.5 |
| Mixing system: | | | | | |
| Time hr | 48 | 48 | 48 | 12 | 12 |
| Temp. of aq. suspension °C. | 35 | 15 | 15 | 15 | 15 |
| pH of aq. suspension | 6.5–6 | 7.5–7 | 7.5–7 | 7–8 | 7–8 |
| Circumferential speed of stirring blade m/sec. | 1.0 | 6.0 | 6.0 | 1.0 | 6.0 |
| Aging system: | | | | | |
| Ca conc. % | 1.7 | 1.7 | 1.7 | 1.7 | 1.8 |
| Time hr | 48 | 48 | 48 | 48 | 48 |
| Temp. of aq. suspension °C. | 35 | 35 | 35 | 50 | 35 |
| pH of aq. suspension | 7–7.5 | 7–7.5 | 7–7.5 | 7.5–8 | 7.5–8 |
| Circumferential speed of stirring blade m/sec. | 1.0 | 6.0 | 6.0 | 1.0 | 6.0 |

TABLE 9

| Examples | 1 | 2 | 3 | 4 | 5 | 6 | 7 |
|---|---|---|---|---|---|---|---|
| Particles *1 | E1 | E2 | E3 | E4 | E5 | E6 | E7 |
| d x 1 μm | 7.0 | 10.0 | 5.0 | 4.5 | 12.0 | 12.0 | 2.3 |
| α | 1.3 | 2.2 | 1.3 | 1.3 | 1.3 | 1.2 | 1.1 |
| β | 0.9 | 1.8 | 0.8 | 0.9 | 1.1 | 1.3 | 0.7 |
| d x 2 μm | 0.02 | 0.02 | 0.02 | 0.02 | 0.03 | 0.02 | 0.02 |
| ω1 | 97 | 97 | 97 | 96 | 95 | 95 | 97 |
| ω2 | 87 | 85 | 87 | 82 | 72 | 72 | 87 |
| S w 1 | 170 | 130 | 200 | 150 | 90 | 95 | 180 |
| Ingredient *2 (X-RAY) | HAP | HAP | HAP | HAP | HAP | HAP | HAP |

*1 Petaloid porous hydroxyapatite fine particles corresponding to examples
*2 Ingredients identified were shown in an order of higher contents.

TABLE 10

| Examples | 8 | 9 | 10 | 11 | 12 | 13 | 14 |
|---|---|---|---|---|---|---|---|
| Particles *1 | E8 | E9 | E10 | E11 | E12 | E13 | E14 |
| d x 1 μm | 1.5 | 7.0 | 7.0 | 8.3 | 1.8 | 1.8 | 5.8 |
| α | 1.0 | 1.3 | 1.4 | 1.8 | 1.6 | 1.4 | 1.3 |
| β | 0.6 | 0.9 | 1.3 | 1.2 | 0.9 | 0.9 | 0.9 |
| d x 2 μm | 0.02 | 0.02 | 0.02 | 0.02 | 0.02 | 0.02 | 0.04 |
| ω1 | 97 | 96 | 96 | 95 | 95 | 96 | 96 |
| ω2 | 87 | 85 | 86 | 84 | 83 | 84 | 83 |
| S w 1 | 180 | 150 | 130 | 150 | 140 | 160 | 140 |
| Ingredient *2 (X-RAY) | HAP | HAP | HAP | HAP | HAP | HAP | HAP |

TABLE 11

| Examples | 15 | 16 | 17 | 18 | 19 | 20 |
|---|---|---|---|---|---|---|
| Particles *1 | E15 | E16 | E17 | E18 | E19 | E20 |
| d x 1 μm | 1.6 | 6.5 | 6.0 | 6.8 | 6.8 | 6.2 |
| α | 1.2 | 1.4 | 1.4 | 1.3 | 1.3 | 1.3 |
| β | 1.3 | 1.3 | 1.2 | 0.7 | 0.8 | 0.8 |
| d x 2 μm | 0.04 | 0.02 | 0.02 | 0.03 | 0.03 | 0.04 |
| ω1 | 96 | 96 | 95 | 97 | 97 | 98 |
| ω2 | 83 | 85 | 84 | 88 | 87 | 88 |
| S w 1 | 150 | 120 | 120 | 270 | 257 | 283 |
| Ingredient *2 (X-RAY) | HAP | HAP | HAP | HAP | HAP | HAP |

COMPARATIVE EXAMPLES 1–8

According to raw materials and preparation conditions shown in Tables 7–8, into a stainless steel tank equipped with baffle plates and a stirrer with a turbine blade, an aqueous suspension of calcium carbonate which was diluted and adjusted in concentration and temperature was introduced. Under mixing, a dilute aqueous solution of phosphoric acid or an aqueous suspension dispersion of calcium hydrogenphosphate.2H$_2$O were dropped into the tank so that an atomic ratio of Ca/P become 1.67, and mixed. After mixing is completed, aging was performed with stirring. After aging, particles F1–F8 were prepared by spray drying. Total amount of the raw materials and water was 400 kg.

Properties of the particles F1–8 prepared in Comparative examples 1–8 are shown in Tables 12–13.

From the X-ray diffraction, the prepared particles F1–8 are calcium phosphate compounds containing calcium hydrogenphosphate.2H$_2$O (abbreviation: DCPD) and/or octacalcium phosphate (abbreviation: OCP) which are calcium phosphate compounds other than hydroxyapatite and a large amount of unreacted carbon dioxide. From the photograph of the electron microscope, slender petaloid shapes were found on the surface of the calcium carbonate that is a raw material, but in the inside thereof, unreacted calcium carbonate existed. The plate-like particles having a size of 100 μm or more, suspected to be DCPD were recognized in particles F1, F2, F3 and F8.

Properties of F1–8 prepared in Comparative examples 1–8 were, as shown in Tables 12–13, extremely inferior as compared with Examples 1–20.

COMPARATIVE EXAMPLE 9

7.4 kg of a milk of lime (an aqueous suspension of calcium hydroxide) with a solid concentration of 10% was put into a 15 liters of reaction vessel equipped with baffle plates, and under vigorous stirring of the suspension by a dissolver blade having a diameter of 10% cm at 3000 rpm, 1.47 kg of phosphoric acid with a concentration of 40% was gradually added at room temperature (27° C.) over 240 minutes. After aging at 27° C. for 24 hours under slow stirring, the product was dehydrated by Labofilter press, washed with acetone, dried by a box type dryer at 100° C., and crushed so as to obtain about 1 kg of particles F9. Properties of F9 prepared in Comparative example 9 were shown in Table 13. The particles F9 were a mixture of tricalcium phosphate hydrate and hydroxyapatite from the X-ray diffraction and were super fine particles of 0.02 μm from the photograph of the electron microscope, but not a hydroxyapatite composed of petaloid structure. Moreover, the dispersibility of the particles was extremely inferior and other properties were also extremely inferior as compared with Examples 1–20.

TABLE 7

| Comp. examples | 1 | 2 | 3 | 4 | 5 |
|---|---|---|---|---|---|
| Kind of aq. suspension dispersion of calcium carbonate | B1 | B2 | B3 | B2 | B2 |
| Solid conc. of aq. suspension dispersion of calcium carbonate after prepared % | 12 | 12 | 12 | 8 | 8 |
| Solid conc. of dilute aq. solution of phosphoric acid % | 15 | 15 | 15 | | |
| Kind of aq. suspension dispersion of calcium hydrogenphosphate · 2H$_2$O | | | | D1 | D2 |
| Solid conc. of aq. suspension dispersion of calcium hydrogenphosphate · 2H$_2$O % | | | | 5.5 | 5.5 |
| Mixing system: | | | | | |
| Time hr | 2.5 | 2.5 | 2.5 | 0.5 | 0.5 |
| Temp. of aq. suspension °C. | 27 | 27 | 27 | 35 | 35 |
| pH of aq. suspension | 3–4 | 4–5 | 4–5 | 6–7 | 5–8 |
| Circumferential speed of stirring blade m/sec. | 1.0 | 1.0 | 1.0 | 1.0 | 6.0 |

TABLE 7-continued

| Comp. examples | 1 | 2 | 3 | 4 | 5 |
|---|---|---|---|---|---|
| Aging system: | | | | | |
| Ca conc. | 3.4 | 3.4 | 3.4 | 1.7 | 1.7 |
| Time hr | 48 | 48 | 48 | 48 | 48 |
| Temp. of aq. suspension °C. | 27 | 27 | 27 | 50 | 50 |
| pH of aq. suspension | 5–6 | 5.5–6 | 6–7 | 5–8 | 5–8 |
| Circumferential speed of stirring blade m/sec. | 1.0 | 1.0 | 1.0 | 1.0 | 1.0 |

TABLE 8

| Comp. examples | 6 | 7 | 8 |
|---|---|---|---|
| Kind of aq. suspension dispersion of calcium carbonate | B2 | B2 | B2 |
| Solid conc. of aq. suspension dispersion of calcium carbonate after prepared % | 25 | 12 | 12 |
| Solid conc. of dilute aq. solution of phosphoric acid % | 75 | 15 | 15 |
| Mixing system: | | | |
| Time hr | 2.5 | 2.5 | 0.05 |
| Temp. of aq. suspension °C. | 35 | 90 | 35 |
| pH of aq. suspension | 4–5 | 4.5–6 | 4.5–5 |
| Circumferential speed of stirring blade m/sec. | 0.5 | 0.5 | 0.5 |
| Aging system: | | | |
| Ca conc. % | 8.2 | 3.4 | 3.4 |
| Time hr | 48 | 12 | 48 |
| Temp. of aq. suspension °C. | 50 | 90 | 27 |
| pH of aq. suspension | 6–8 | 6–8 | 5–7 |
| Circumferential speed of stirring blade m/sec. | 1.0 | 1.0 | 1.0 |

TABLE 12

| Comp. examples | 1 | 2 | 3 | 4 | 5 | 6 | 7 |
|---|---|---|---|---|---|---|---|
| Particles *3 | F1 | F2 | F3 | F4 | F5 | F6 | F7 |
| d x 1 μm | 25.0 | 10.0 | 9.0 | 11.0 | 10.5 | 10.5 | 12.0 |
| α | 1.6 | 2.3 | 2.9 | 2.5 | 2.6 | 2.7 | 2.4 |
| β | 3.1 | 3.2 | 3.7 | 2.1 | 3.2 | 3.2 | 3.4 |
| d x 2 μm | 0.4 | 0.2 | 0.1 | 0.2 | 0.2 | 0.2 | 0.2 |

TABLE 12-continued

| Comp. examples | 1 | 2 | 3 | 4 | 5 | 6 | 7 |
|---|---|---|---|---|---|---|---|
| Particles *3 | F1 | F2 | F3 | F4 | F5 | F6 | F7 |
| ω1 | 84 | 89 | 92 | 93 | 91 | 94 | 97 |
| ω2 | 45 | 60 | 68 | 65 | 64 | 68 | 70 |
| S w 1 | 8 | 12 | 38 | 25 | 23 | 89 | 23 |
| Ingredients (X-RAY) | DCPD OCP CaCO3 HAP | DCPD OCP CaCO3 HAP | DCPD OCP CaCO3 HAP | HAP OCP CaCO3 | HAP OCP CaCO3 | HAP OCP CaCO3 | OCP CaCO3 HAP |

*3 Calcium phosphate particles corresponding to comparative examples

TABLE 13

| Comp. examples | 8 | 9 |
|---|---|---|
| Particles *3 | F8 | F9 |
| d x 1 μm | 11.0 | 0.02 |
| α | 2.4 | 600 |
| β | 6.2 | 5.4 |
| d x 2 μm | 0.2 | Not measured |
| ω1 | 90 | 93 |
| ω2 | 64 | 67 |
| S w 1 | 15 | 171 |
| Ingredients (X-RAY) | DCPD OCP CaCO3 HAP | TCP HAP | obtain naphthalene (agricultural medicine) adsorbed sustained-release materials E1–E20. The sustained-release materials were put into a thermostatic chamber of 40° C. and the residual amounts of naphthalene were measured with the lapse of time so as to evaluate the sustained-release ability. The results are shown in Table 14. Although the sustained-release ability of Application comparative examples 1–9, which will be explained later, is extremely bad and inferior, it is made clear that the fine particles of petaloid porous hydroxyapatite of the present invention are excellent as a carrier for sustained-release materials.

TABLE 14

| | Particles as carrier | Sustained-release materials | Adsorbed amount of naphthalene g | Residual amount | | Evaluation of sustained-release ability |
|---|---|---|---|---|---|---|
| | | | | 15 days after g | 30 days after g | |
| Appln.ex. 1 | Ex. 1 | E 1 | 0.60 | 0.30 | 0.15 | Good |
| Appln.ex. 2 | Ex. 2 | E 2 | 0.52 | 0.27 | 0.13 | Good |
| Appln.ex. 3 | Ex. 3 | E 3 | 0.62 | 0.30 | 0.14 | Good |
| Appln.ex. 4 | Ex. 4 | E 4 | 0.41 | 0.20 | 0.11 | Good |
| Appln.ex. 5 | Ex. 5 | E 5 | 0.23 | 0.13 | 0.05 | Good |
| Appln.ex. 6 | Ex. 6 | E 6 | 0.23 | 0.14 | 0.06 | Good |
| Appln.ex. 7 | Ex. 7 | E 7 | 0.61 | 0.30 | 0.14 | Good |
| Appln.ex. 8 | Ex. 8 | E 8 | 0.61 | 0.30 | 0.14 | Good |
| Appln.ex. 9 | Ex. 9 | E 9 | 0.51 | 0.25 | 0.13 | Good |
| Appln.ex. 10 | Ex. 10 | E 10 | 0.53 | 0.26 | 0.14 | Good |
| Appln.ex. 11 | Ex. 11 | E 11 | 0.53 | 0.27 | 0.13 | Good |
| Appln.ex. 12 | Ex. 12 | E 12 | 0.47 | 0.24 | 0.10 | Good |
| Appln.ex. 13 | Ex. 13 | E 13 | 0.35 | 0.12 | 0.08 | Good |
| Appln.ex. 14 | Ex. 14 | E 14 | 0.54 | 0.26 | 0.11 | Good |
| Appln.ex. 15 | Ex. 15 | E 15 | 0.58 | 0.26 | 0.13 | Good |
| Appln.ex. 16 | Ex. 16 | E 16 | 0.51 | 0.26 | 0.13 | Good |
| Appln.ex. 17 | Ex. 17 | E 17 | 0.44 | 0.23 | 0.11 | Good |
| Appln.ex. 18 | Ex. 18 | E 18 | 0.62 | 0.49 | 0.35 | Good |
| Appln.ex. 19 | Ex. 19 | E 19 | 0.60 | 0.41 | 0.27 | Good |
| Appln.ex. 20 | Ex. 20 | E 20 | 0.61 | 0.39 | 0.26 | Good |

APPLICATION EXAMPLES 1–20

Each 1 g of particles E1–E20 which are fine particles of petaloid porous hydroxyapatite of Examples 1–20 was pressure molded at 25 kg/cm² so as to form a carrier of a cylindrical shape with a diameter of 2 cm. The carrier was immersed into a 10% naphthalene carbon tetrachloride solution and the carbon tetrachloride was evaporated to thereby

APPLICATION COMPARATIVE EXAMPLES 1–9

Naphthalene adsorbed sustained-release materials F1–F9 were prepared in the same manner as in Application examples 1–20 except that "particles E1–E20 which were fine particles of petaloid porous hydroxyapatite of Examples 1–20" was changed to "particles F1–F9 of Comparative Examples 1–9". The obtained sustained-release materials were measured for naphthalene sustained-release ability with the lapse of time. The results are shown in Table 15.

TABLE 15

| | Particles as carrier | Sustained-release materials | Adsorbed amount of naphthalene g | Residual amount 15 days after g | Residual amount 30 days after g | Evaluation of sustained-release ability |
|---|---|---|---|---|---|---|
| Appln.Comp.ex. 1 | Comp.ex. 1 | F 1 | 0.07 | 0.02 | 0 | Not good |
| Appln.Comp.ex. 2 | Comp.ex. 2 | F 2 | 0.13 | 0.04 | 0 | Not good |
| Appln.Comp.ex. 3 | Comp.ex. 3 | F 3 | 0.19 | 0.05 | 0 | Not good |
| Appln.Comp.ex. 4 | Comp.ex. 4 | F 4 | 0.17 | 0.05 | 0 | Not good |
| Appln.Comp.ex. 5 | Comp.ex. 5 | F 5 | 0.16 | 0.04 | 0 | Not good |
| Appln.Comp.ex. 6 | Comp.ex. 6 | F 6 | 0.19 | 0.05 | 0 | Not good |
| Appln.Comp.ex. 7 | Comp.ex. 7 | F 7 | 0.21 | 0.05 | 0 | Not good |
| Appln.Comp.ex. 8 | Comp.ex. 8 | F 8 | 0.16 | 0.03 | 0 | Not good |
| Appln.Comp.ex. 9 | Comp.ex. 9 | F 9 | 0.18 | 0.07 | 0 | Not good |

APPLICATION EXAMPLES 21–40

Each 10 g of particles E1–E20 which are fine particles of petaloid porous hydroxyapatite of Examples 1–20 was sprayed by 5 g of a 40% tannic acid aqueous solution so as to prepare adsorbents comprising tannic acid-adsorbed fine particles of petaloid porous hydroxyapatite E1–E20 to which 2 g of tannic acid was adsorbed. For evaluating the deodorizing ability of the adsorbent, a scrubbing bottle (volume of 300 ml) containing 150 ml of a 10% aqueous ammonium solution and having a column packed with the adsorbent at its outlet was prepared. From an inlet, nitrogen gas was flowed at a rate of 500 ml/min., and the ammonium gas that has passed through the column was introduced into an aqueous hydrochloric acid solution of pH4. The sustainment of the deodorizing ability was evaluated as a time required for the pH of the solution becoming 10 or more where ammonium was no more adsorbed by the adsorbent. The results are shown in Table 16. Application examples 21–40 revealed good results compared with Application comparative examples 10–18, which will be explained later, and therefore, it became clear that the fine particles of petaloid porous hydroxyapatite of the present invention is superior as a carrier for deodorants.

TABLE 16

| | Particles | Adsorbents | Adsorbing time required until pH 10 or more (min) | Evaluation of adsorbing ability |
|---|---|---|---|---|
| Appln.ex. 21 | Ex. 1 | E1 | 26 | Good |
| Appln.ex. 22 | Ex. 2 | E2 | 23 | Good |
| Appln.ex. 23 | Ex. 3 | E3 | 26 | Good |
| Appln.ex. 24 | Ex. 4 | E4 | 24 | Good |
| Appln.ex. 25 | Ex. 5 | E5 | 20 | Good |
| Appln.ex. 26 | Ex. 6 | E6 | 21 | Good |
| Appln.ex. 27 | Ex. 7 | E7 | 27 | Good |
| Appln.ex. 28 | Ex. 8 | E8 | 27 | Good |
| Appln.ex. 29 | Ex. 9 | E9 | 22 | Good |
| Appln.ex. 30 | Ex. 10 | E10 | 24 | Good |
| Appln.ex. 31 | Ex. 11 | E11 | 26 | Good |
| Appln.ex. 32 | Ex. 12 | E12 | 23 | Good |
| Appln.ex. 33 | Ex. 13 | E13 | 21 | Good |
| Appln.ex. 34 | Ex. 14 | E14 | 21 | Good |
| Appln.ex. 35 | Ex. 15 | E15 | 25 | Good |
| Appln.ex. 36 | Ex. 16 | E16 | 23 | Good |
| Appln.ex. 37 | Ex. 17 | E17 | 19 | Good |
| Appln.ex. 38 | Ex. 18 | E18 | 43 | Good |
| Appln.ex. 39 | Ex. 19 | E19 | 35 | Good |
| Appln.ex. 40 | Ex. 20 | E20 | 33 | Good |

APPLICATION COMPARATIVE EXAMPLES 10–18

Adsorbents comprising tannic acid-adsorbed particles F1–F9 were prepared in the same manner as in Application examples 21–40 except that "particles E1–E20 which were fine particles of petaloid porous hydroxyapatite of Examples 1–20" was changed to "particles F1–F9 of Comparative Examples 1–9". The sustainment of the deodorizing ability was measured and the results are shown in Table 17.

TABLE 17

| | Particles | Adsorbents | Adsorbing time required until pH 10 or more (min) | of adsorbing ability |
|---|---|---|---|---|
| Appln.Comp.ex.10 | Comp.ex.1 | F1 | 5 | Not good |
| Appln.Comp.ex.11 | Comp.ex.2 | F2 | 7 | Not good |
| Appln.Comp.ex.12 | Comp.ex.3 | F3 | 9 | Not good |
| Appln.Comp.ex.13 | Comp.ex.4 | F4 | 8 | Not good |
| Appln.Comp.ex.14 | Comp.ex.5 | F5 | 8 | Not good |
| Appln.Comp.ex.15 | Comp.ex.6 | F6 | 11 | Normal |
| Appln.Comp.ex.16 | Comp.ex.7 | F7 | 8 | Not good |
| Appln.Comp.ex.17 | Comp.ex.8 | F8 | 7 | Not good |
| Appln.Comp.ex.18 | Comp.ex.9 | F9 | 13 | Normal |

APPLICATION EXAMPLES 41–60

Each 1 g of particles E1–E20 which are fine particles of petaloid porous hydroxyapatite of Examples 1–20 was pressure molded at 25 kg/cm² so as to form a carrier of a cylindrical shape with a diameter of 2 cm. To the carrier, 1 g of a 5% alkylpo lyaminoethylglycine hydrochloride aqueous solution was impregnated so as to prepare sustained-release materials of alkylpoly aminoethylglycine hydrochloride-adsorbed inorganic particles E1–E20 (fungicide). The sustained-release material was put into a glass container having a volume of 500 ml, and a filter paper was put on the material. On the filter paper, a peace of bread of 3 cm square was put and was left to stand in a dark place of humidity of 60%. The appearance of fungi on the bread was observed with the lapse of time so as to measure the sustained-release ability and the anti-fungal ability, and the results are shown in Table 18. The Application examples 41–60 revealed good results compared with Application comparative examples 19–27 which will be described later. It is clear that the fine particles of petaloid porous hydroxyapatite of the present invention are excellent as carriers for sustained-release carriers and for fungicide sustained-release carriers.

TABLE 18

| | Particles as carrier | Sustained-release material | Growth or none of fungi | | | Evaluation of sustained-release ability |
|---|---|---|---|---|---|---|
| | | | 30 days later | 90 days later | 120 days later | |
| Appln.ex. 41 | Ex. 1 | E1 | None | None | None | Good |
| Appln.ex. 42 | Ex. 2 | E2 | None | None | None | Good |
| Appln.ex. 43 | Ex. 3 | E3 | None | None | None | Good |
| Appln.ex. 44 | Ex. 4 | E4 | None | None | None | Good |
| Appln.ex. 45 | Ex. 5 | E5 | None | None | None | Good |
| Appln.ex. 46 | Ex. 6 | E6 | None | None | None | Good |
| Appln.ex. 47 | Ex. 7 | E7 | None | None | None | Good |
| Appln.ex. 48 | Ex. 8 | E8 | None | None | None | Good |
| Appln.ex. 49 | Ex. 9 | E9 | None | None | None | Good |
| Appln.ex. 50 | Ex. 10 | E10 | None | None | None | Good |
| Appln.ex. 51 | Ex. 11 | E11 | None | None | None | Good |
| Appln.ex. 52 | Ex. 12 | E12 | None | None | None | Good |
| Appln.ex. 53 | Ex. 13 | E13 | None | None | None | Good |
| Appln.ex. 54 | Ex. 14 | E14 | None | None | None | Good |
| Appln.ex. 55 | Ex. 15 | E15 | None | None | None | Good |
| Appln.ex. 56 | Ex. 16 | E16 | None | None | None | Good |
| Appln.ex. 57 | Ex. 17 | E17 | None | None | None | Good |
| Appln.ex. 58 | Ex. 18 | E18 | None | None | None | Good |
| Appln.ex. 59 | Ex. 19 | E19 | None | None | None | Good |
| Appln.ex. 60 | Ex. 20 | E20 | None | None | None | Good |

APPLICATION COMPARATIVE EXAMPLES 19–27

Sustained-release materials comprising alkylpolyaminoethylglycine hydrochloride (fungicide)-adsorbed particles F1–F9 were prepared in the same manner as in Application examples 41–60 except that "particles E1–E20 which were fine particles of petaloid porous hydroxyapatite of Examples 1–20" was changed to "particles F1–F9 of Comparative examples 1–9". The sustained-release ability and the fungicide ability were measured. The results are shown in Table 19.

TABLE 19

| | Particles as carrier | Sustained-release material | Growth or none of fungi | | | Evaluation of sustained-release ability |
|---|---|---|---|---|---|---|
| | | | 30 days later | 90 days later | 120 days later | |
| Appln.Comp.ex.19 | Comp.Ex.1 | F1 | Growth | Growth | Growth | Not good |
| Appln.Comp.ex.20 | Comp.Ex.2 | F2 | None | Growth | Growth | Not good |
| Appln.Comp.ex.21 | Comp.Ex.3 | F3 | None | Growth | Growth | Not good |
| Appln.Comp.ex.22 | Comp.Ex.4 | F4 | None | Growth | Growth | Not good |
| Appln.Comp.ex.23 | Comp.Ex.5 | F5 | None | Growth | Growth | Not good |
| Appln.Comp.ex.24 | Comp.Ex.5 | F6 | None | Growth | Growth | Not good |
| Appln.Comp.ex.25 | Comp.Ex.7 | F7 | None | Growth | Growth | Not good |
| Appln.Comp.ex.26 | Comp.Ex.8 | F8 | None | Growth | Growth | Not good |
| Appln.Comp.ex.27 | Comp.Ex.9 | F9 | None | Growth | Growth | Not good |

APPLICATION EXAMPLES 61–80

Each 0.3 g of particles E1–E20 which are fine particles of petaloid porous hydroxyapatite of Examples 1–20 was dispersed in 99.7 g of water by an ultrasonic disperser so as to prepare 100 g of an aqueous dispersion of E1–E20. To a reduced pressure holder KGS-47 made of glass (made by Toyo Advantic Co., Ltd., 100 mesh stainless support screen, effective filter area 9.6 cm$^2$), one No.1 filter paper (made by Toyo Advantic Co., Ltd.) was set. After the filter was wetted by water, 100 g of the aqueous dispersion of E1–E20 was filtered under reduced condition of 300 mmHg so as to pre-coat 1 g of fine particles of petaloid porous hydroxyapatite E1–E20 on the No.2 paper. To the paper, a filtration test using a dispersion containing latex particles of 0.3 µm in a concentration of 5% was done. Capturing ability (the higher the capturing efficiency is, the better the capturing ability is good, and the nearer the efficiency becomes 100%, the better ability) was measured by the concentration of the latex in the filtrate. The results are shown in Table 20. From the results of Table 20, it was clear that the fine particles of petaloid porous hydroxyapatite of the present invention are useful as filtering aids.

TABLE 20

| Particles | Filtering aids | Filtering accuracy of 0.3 µm latex particles | Evaluation of filtering aids |
|---|---|---|---|
| Appln.ex.61 | Ex. 1 | E1 | 95 | Good |
| Appln.ex.62 | Ex. 2 | E2 | 92 | Good |
| Appln.ex.63 | Ex. 3 | E3 | 96 | Good |
| Appln.ex.64 | Ex. 4 | E4 | 92 | Good |
| Appln.ex.65 | Ex. 5 | E5 | 90 | Good |
| Appln.ex.66 | Ex. 6 | E6 | 90 | Good |
| Appln.ex.67 | Ex. 7 | E7 | 96 | Good |
| Appln.ex.68 | Ex. 8 | E8 | 98 | Good |
| Appln.ex.69 | Ex. 9 | E9 | 91 | Good |
| Appln.ex.70 | Ex. 10 | E10 | 91 | Good |
| Appln.ex.71 | Ex. 11 | E11 | 93 | Good |
| Appln.ex.72 | Ex. 12 | E12 | 92 | Good |
| Appln.ex.73 | Ex. 13 | E13 | 91 | Good |
| Appln.ex.74 | Ex. 14 | E14 | 90 | Good |
| Appln.ex.75 | Ex. 15 | E15 | 97 | Good |
| Appln.ex.76 | Ex. 16 | E16 | 92 | Good |
| Appln.ex.77 | Ex. 17 | E17 | 91 | Good |
| Appln.ex.78 | Ex. 18 | E18 | 98 | Good |
| Appln.ex.79 | Ex. 19 | E19 | 96 | Good |
| Appln.ex.80 | Ex. 20 | E20 | 97 | Good |

APPLICATION COMPARATIVE EXAMPLES 28–36

The filtering test were done in the same manner as in Application examples 61–80 except that "particles E1–E20 which were fine particles of petaloid porous hydroxyapatite of Examples 1–20" was changed to "particles F1–F9 of Comparative Examples 1–9".

The properties as filtering aids are shown in Table 21.

TABLE 21

| Particles | Filtering aids | Filtering accuracy of 0.3 µm latex particles | Evaluation of filtering aids |
|---|---|---|---|
| Appln.Com.ex. 28 | Comp.ex.1 | F1 | 27 | Not good |
| Appln.Com.ex. 29 | Comp.ex.2 | F2 | 28 | Not good |
| Appln.Com.ex. 30 | Comp.ex.3 | F3 | 32 | Not good |
| Appln.Com.ex. 31 | Comp.ex.4 | F4 | 34 | Not good |
| Appln.Com.ex. 32 | Comp.ex.5 | F5 | 38 | Not good |
| Appln.Com.ex. 33 | Comp.ex.6 | F6 | 45 | Not good |
| Appln.Com.ex. 34 | Comp.ex.7 | F7 | 34 | Not good |
| Appln.Com.ex. 35 | Comp.ex.8 | F8 | 31 | Not good |
| Appln.Com.ex. 36 | Comp.ex.9 | F9 | 50 | Not good |

INDUSTRIAL APPLICABILITY

As described above, fine particles of petaloid porous hydroxyapatite of the present invention are useful in a variety of fields such as carriers for catalysts, pharmaceuticals, agricultural medicines, microbials and so on, adsorbents or absorbents, sustained-release materials, filtering agents, filtering aids, biological materials, fillers of plastics, rubbers, paints, a paper manufacture and so on, and anti-blocking agents for fibers and films and other wide area.

Furthermore, according to the manufacturing method of the present invention, fine particles of petaloid porous hydroxyapatite can be manufactured industrially and advantageously.

We claim:

1. Fine particles of petaloid porous hydroxyapatite which satisfy the following formulas (a)–(g) and which have an atomic ratio of Ca/P ranging from 1.62 to 1.72 and a chemical formula $Ca_5(PO_4)_3OH$:

$$0.2 \leq dx1 \leq 20 (\mu m) \tag{a}$$

$$1 \leq \alpha \leq 5, \text{ where } \alpha = d50/dx1 \tag{b}$$

$$0 \leq \beta \leq 2, \text{ where } \beta = (d90-d10)/d50 \tag{c}$$

$$0.01 \leq dx2 \leq 1 (\mu m) \tag{d}$$

$$95 \leq \omega 1 \leq 99 \tag{e}$$

$$70 \leq \omega 2 \leq 95 \tag{f}$$

$$50 \leq Sw1 \leq 500 \tag{g}$$

wherein:
- dx1: Average particle diameter (µm) of the fine particles of petaloid porous hydroxyapatite measured by a photograph of an electron microscope;
- α: Dispersion coefficient;
- d50: 50% average particle diameter (µm) measured by a particle size distribution tester using a microtrack FRA laser;
- β: Sharpness; a particle size distribution value; the smaller the value becomes, the sharper the distribution becomes;
- d90: 90% particle diameter (µm) of the total fine particles of petaloid porous hydroxyapatite passed through a sieve measured by a particle size distribution tester using a microtrack FRA laser;
- d10: 10% particle diameter (µm) of the total fine particles of petaloid porous hydroxyapatite passed through a sieve measured by a particle size distribution tester using a microtrack FRA laser;
- dx2: Average micropore diameter (µm) of the fine particles of petaloid porous hydroxyapatite measured from a micropore distribution measured by a mercury penetration method;

ω1: Static percentage of voids (%) calculated from the following equation (h):

$$(h) \omega 1 = \left\{ 1 - \frac{1}{3.1 \times [\text{apparent specific volume}]} \right\} \times 100 \, (\%)$$

wherein the number of 3.1 is a specific gravity of hydroxyapatite, and wherein an apparent specific volume (ml/g) is measured according to a static method of pigment test of JIS K5101-91 20.1;

ω2: pressurized percentage of voids (%) calculated from the following equation (i):

$$(i) \omega 2 = \left\{ 1 - \frac{0.5}{3.1 \times 2 \times [\text{thickness}]} \right\} \times 100 (\%)$$

wherein the number of 3.1 is a specific gravity of hydroxyapatite, and wherein the thickness is measured by slide calipers after packing 0.5 g of a sample in a cylinder having a section of 2 cm², pressurizing the sample with a pressure of 30 kg/cm² for 30 seconds; and Sw1: BET specific surface m²/g by a nitrogen adsorbing method.

2. The fine particles of petaloid porous hydroxyapatite of claim 1, wherein the average particle diameter dx1 satisfies the following formula (j):

$$0.2 \leq dx1 \leq 5 (\mu m). \quad (j)$$

3. The fine particles of petaloid porous hydroxyapatite of claim 1, wherein the average particle diameter dx1 satisfies the following formula (k):

$$0.2 \leq dx1 \leq 3 (\mu m). \quad (k)$$

4. The fine particles of petaloid porous hydroxyapatite of any one of claims 1–3, wherein the dispersion coefficient α and the sharpness β satisfy the following formulas (l) and (m), respectively:

$$1 \leq \alpha \leq 2 (\mu m) \quad (l)$$

$$0 \leq \beta \leq 0.5 (\mu m). \quad (m)$$

5. The fine particles of petaloid porous hydroxyapatite of any one of claims 1–3, wherein the BET specific surface Sw1 satisfies the following formula (n):

$$100 \leq Sw1 \leq 450. \quad (n)$$

6. A method for manufacturing fine particles of petaloid porous hydroxyapatite which comprises the steps of:
mixing in water an aqueous suspension dispersion of calcium carbonate having an average particle diameter of 0.1–5 μm measured by a particle size distribution tester of SA-CP3 manufactured by Shimadzu Corp., and a dilute aqueous solution of phosphoric acid and/or an aqueous suspension dispersion of calcium dihydrogen phosphate having an average particle diameter of 2–10 μm measured by a particle distribution tester of SA-CP3 manufactured by Shimadzu Corp. and/or an aqueous suspension dispersion of calcium hydrogenphosphate.2H₂O having an average particle diameter of 2–10 μm measured by a particle distribution tester of SA-CP3 manufactured by Shimadzu Corp. so that an atomic ratio of Ca/P becomes 1.62–1.72 under the following mixing conditions,
aging the resultant product under the following aging conditions,
drying the aged product under drying conditions of not more than 700° C. after dehydration or without dehydration, and
crushing the dried product;

Mixing conditions:
Solid concentration of the aqueous suspension dispersion of calcium carbonate: 1–15%;
Concentration of the dilute aqueous solution of phosphoric acid: 1–50%;
Solid concentration of the aqueous suspension dispersion of calcium dihydrogen phosphate: 2–15%;
Solid concentration of the aqueous suspension dispersion of calcium hydrogenphosphate.2H₂O: 2–15%;
Circumferential speed of a stirring blade: not less than 0.5 m/second;
Mixing time: 0.1–150 hours;
Temperature of the aqueous suspension: 0–80° C.;
pH of the aqueous suspension: 5–9;

Aging conditions:
Calcium concentration: 0.4–5%;
Circumferential speed of a stirring blade: not less than 0.5 m/second;
Aging time: 0.1–100 hours;
Temperature of the aqueous suspension: 20–80° C.;
pH of the aqueous suspension: 6–9.

7. The method for manufacturing fine particles of petaloid porous hydroxyapatite of claim 6, wherein, to the aqueous suspension dispersion of calcium carbonate having a solid concentration of 1–15%, the dilute aqueous solution of phosphoric acid having a concentration of 1–50% and/or the aqueous suspension dispersion of calcium dihydrogen phosphate having an average particle diameter of 2–10 μm measured by a particle distribution tester of SA-CP3 manufactured by Shimadzu Corp. and/or the aqueous suspension dispersion of calcium hydrogenphosphate.2H₂O having an average particle diameter of 2–10 μm measured by a particle distribution tester of SA-CP3 manufactured by Shimadzu Corp. are added dropwise gradually under stirring and mixed.

8. The method for manufacturing fine particles of petaloid porous hydroxyapatite of claim 6, wherein, to the aqueous suspension dispersion of calcium carbonate having a solid concentration of 3–10%, the dilute aqueous solution of phosphoric acid having a concentration of 2–20% is added dropwise gradually under stirring and mixed.

9. The method for manufacturing fine particles of petaloid porous hydroxyapatite of any one of claims 6–8, wherein the calcium carbonate is manufactured by a wet synthetic method and has an average particle diameter of 0.01–0.2 μm which is measured by a photograph of an electron microscope.

10. The method for manufacturing fine particles of petaloid porous hydroxyapatite of any one of claims 6–8, wherein the calcium carbonate is manufactured by a wet synthetic method and has an average particle diameter of 0.01–0.07 μm which is measured by a photograph of an electron microscope.

11. The method for manufacturing fine particles of petaloid porous hydroxyapatite of any one of claims 6–8, wherein the aqueous suspension dispersion of calcium carbonate is an aqueous suspension dispersion of calcium carbonate having an average particle diameter of 0.1–1 μm measured by a particle distribution tester of SA-CP3 manufactured by Shimadzu Corp.

12. The method for manufacturing fine particles of petaloid porous hydroxyapatite of any one of claims 6–11, wherein the aqueous suspension dispersion of calcium carbonate is an aqueous suspension dispersion of calcium carbonate with 0% in total % of coarse particles of not less than 5 μm which is measured by a particle distribution tester of SA-CP3 manufactured by Shimadzu Corp.

13. The method for manufacturing fine particles of petaloid porous hydroxyapatite of any one of claims 6–8, wherein the mixing conditions and the aging conditions are as follows:

Mixing conditions:
  Solid concentration of the aqueous suspension dispersion of calcium carbonate: 3–15%;
  Concentration of the dilute aqueous solution of phosphoric acid: 2–20%;
  Circumferential speed of the stirring blade: not less than 1 m/second;
  Mixing time: 1–48 hours;
  Temperature of the aqueous suspension: 10–60° C.;
  pH of the aqueous suspension: 6–8;
Aging conditions:
  Aging time: 1–48 hours;
  Temperature of the aqueous suspension: 25–60° C.

14. The method for manufacturing fine particles of petaloid porous hydroxyapatite of claim 13, wherein the mixing and aging conditions are as follows:

Mixing conditions:
  Circumferential speed of the stirring blade: not less than 3 m/second;
  Temperature of the aqueous suspension: 10–35° C.;
Aging conditions:
  Circumferential speed of the stirring blade: not less than 3 m/second;
  Temperature of the aqueous suspension: 25–40° C.;
  pH of the aqueous suspension: 7–8.5.

15. The method for manufacturing fine particles of petaloid porous hydroxyapatite of claim 14, wherein the mixing and aging conditions are that the circumferential speed of the stirring blade is not less than 6 m/second in a turbulent flow.

16. The method for manufacturing fine particles of petaloid porous hydroxyapatite of any one of claims 6–8, wherein an average thickness of a layer of the aged product to be dried or an average particle diameter of lumps of the aged product to be dried is not more than 10000 μm.

17. The method for manufacturing fine particles of petaloid porous hydroxyapatite of claim 16, wherein the average thickness of a layer of the aged product to be dried or the average particle diameter of lumps of the aged product to be dried is not more than 1000 μm.

18. The method for manufacturing fine particles of petaloid porous hydroxyapatite of any one of claim 16, wherein a drying time necessary for a heat decrease of weight of the dried powder being not more than 10% when heated at 200° C. for 2 hours is 1–40 seconds.

19. The method for manufacturing fine particles of petaloid porous hydroxyapatite of claim 16, wherein an aged suspension or a dehydrated cake thereof is washed by and/or added to by 5–1000% of a solvent or a mixed solvent of two or more kinds of solvents selected from the group consisting of lower alcohols and lower alkyl ethers, with respect to an amount of water contained in the suspension or the dehydrated cake.

* * * * *